US012681590B2

(12) United States Patent
Zhao et al.

(10) Patent No.: US 12,681,590 B2
(45) Date of Patent: Jul. 14, 2026

(54) ELECTRONIC DEVICE COMPONENT

(71) Applicant: Honor Device Co., Ltd., Shenzhen (CN)

(72) Inventors: Yong Zhao, Shenzhen (CN); Xiaohui Liu, Shenzhen (CN); Yangyang Lv, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 19/003,169

(22) Filed: Dec. 27, 2024

(65) Prior Publication Data

US 2025/0155992 A1     May 15, 2025

Related U.S. Application Data

(63) Continuation of application No. 17/798,037, filed as application No. PCT/CN2022/072176 on Jan. 14, 2022, now Pat. No. 12,197,655.

(30) Foreign Application Priority Data

Mar. 15, 2021     (CN) ........................ 202110293428.X
Apr. 8, 2021     (CN) .......................... 202110379835.2

(51) Int. Cl.
*G06F 3/0354*          (2013.01)
*G06F 1/16*          (2006.01)
(Continued)

(52) U.S. Cl.
CPC ........ G06F 3/03545 (2013.01); G06F 1/1607 (2013.01); G06F 1/1698 (2013.01);
(Continued)

(58) Field of Classification Search
CPC ........ G06F 3/021; G06F 1/1607; G06F 1/266; G06F 3/0231; G06F 3/03545; G06F 3/0412; G06F 2200/1632; H02J 50/10
See application file for complete search history.

(56) References Cited

U.S. PATENT DOCUMENTS 5,375,076 A * 12/1994 Goodrich .............. G06F 1/1669
                                                                  D14/327
8,246,192 B2     8/2012  Xu
(Continued)

FOREIGN PATENT DOCUMENTS

CN          101751160 A      6/2010
CN          102880298 A      1/2013
(Continued)

*Primary Examiner* — William Lu
(74) *Attorney, Agent, or Firm* — Conley Rose, P.C.

(57)          ABSTRACT

Embodiments of this application provide an electronic device component. A first charging coil and a second charging coil are respectively disposed in a wireless keyboard and a stylus. At least one of the first charging coil and the second charging coil is a circle coil, and the circle coil is disposed around circumference of an accommodating portion or the stylus. The stylus can be charged when the stylus is blindly inserted into the accommodating portion, to resolve a prior-art problem that a user cannot quickly charge the stylus because the charging coils need to be aligned for a plurality of times when the stylus is charged.

20 Claims, 12 Drawing Sheets

(51) Int. Cl.

| | |
|---|---|
| *G06F 1/26* | (2006.01) |
| *G06F 3/02* | (2006.01) |
| *G06F 3/023* | (2006.01) |
| *G06F 3/038* | (2013.01) |
| *G06F 3/041* | (2006.01) |
| *G06F 3/044* | (2006.01) |
| *G06F 3/04842* | (2022.01) |
| *G06F 3/04883* | (2022.01) |
| *G06F 40/166* | (2020.01) |
| *H02J 7/34* | (2006.01) |
| *H02J 50/10* | (2016.01) |
| *H02J 50/80* | (2016.01) |
| *H04W 72/21* | (2023.01) |
| *H04W 72/23* | (2023.01) |

(52) U.S. Cl.
CPC .............. *G06F 1/266* (2013.01); *G06F 3/021*
(2013.01); *G06F 3/0231* (2013.01); *G06F*
*3/038* (2013.01); *G06F 3/0383* (2013.01);
*G06F 3/0412* (2013.01); *G06F 3/04162*
(2019.05); *G06F 3/0441* (2019.05); *G06F*
*3/0442* (2019.05); *G06F 3/04842* (2013.01);
*G06F 3/04883* (2013.01); *G06F 40/166*
(2020.01); *H02J 7/342* (2020.01); *H02J 50/10*
(2016.02); *H02J 50/80* (2016.02); *H04W*
*72/21* (2023.01); *H04W 72/23* (2023.01);
*G06F 3/0202* (2013.01); *G06F 2200/1632*
(2013.01); *G06F 2203/0384* (2013.01)

(56) References Cited

U.S. PATENT DOCUMENTS

| | | | | |
|---|---|---|---|---|
| 9,917,456 | B2 * | 3/2018 | Otsuka | G06F 1/266 |
| 10,031,557 | B1 * | 7/2018 | Morrison | G06F 1/189 |
| 10,156,889 | B2 * | 12/2018 | Jakoboski | H02J 50/10 |
| 10,254,803 | B1 * | 4/2019 | Quinn | G06F 1/1688 |
| 10,426,239 | B2 * | 10/2019 | Yang | A45C 13/02 |
| 10,768,723 | B2 * | 9/2020 | Katsurahira | G06F 3/046 |
| 10,775,904 | B2 | 9/2020 | Lee et al. | |
| 10,809,826 | B2 | 10/2020 | Kwon et al. | |
| 11,010,002 | B2 * | 5/2021 | Tanaka | G06F 3/0383 |
| 12,197,655 | B2 * | 1/2025 | Zhao | G06F 3/03545 |
| 2002/0190823 | A1 * | 12/2002 | Yap | G06F 3/03545 |
| | | | | 335/205 |
| 2005/0057516 | A1 * | 3/2005 | Ghosh | G06F 1/162 |
| | | | | 345/168 |
| 2007/0146351 | A1 * | 6/2007 | Katsurahira | G06F 3/04166 |
| | | | | 345/179 |
| 2009/0096413 | A1 * | 4/2009 | Partovi | H02J 7/0013 |
| | | | | 320/108 |
| 2011/0102979 | A1 * | 5/2011 | Jinkinson | G06F 1/1616 |
| | | | | 361/679.01 |
| 2011/0157100 | A1 * | 6/2011 | Hsieh | G06F 3/03545 |
| | | | | 345/179 |
| 2011/0292001 | A1 * | 12/2011 | Liang | G06F 1/1613 |
| | | | | 345/179 |
| 2012/0248913 | A1 * | 10/2012 | Umezawa | H02K 1/02 |
| | | | | 310/152 |
| 2013/0016468 | A1 | 1/2013 | Oh | |
| 2013/0279100 | A1 * | 10/2013 | Fontana | G06F 1/1628 |
| | | | | 361/679.2 |
| 2013/0323941 | A1 * | 12/2013 | Zeliff | H01R 11/30 |
| | | | | 439/39 |
| 2014/0029185 | A1 * | 1/2014 | Leong | G06F 1/1669 |
| | | | | 361/679.08 |
| 2014/0218034 | A1 * | 8/2014 | Ishii | G01R 33/3692 |
| | | | | 324/322 |
| 2014/0266026 | A1 * | 9/2014 | Dowd | H02J 7/342 |
| | | | | 320/108 |
| 2014/0320076 | A1 * | 10/2014 | Kwon | H02J 7/0045 |
| | | | | 320/108 |
| 2015/0015492 | A1 * | 1/2015 | Lee | G06F 1/1656 |
| | | | | 345/168 |
| 2015/0277508 | A1 * | 10/2015 | McCracken | H01H 13/86 |
| | | | | 224/191 |
| 2015/0349578 | A1 * | 12/2015 | Hu | H02J 50/005 |
| | | | | 320/108 |
| 2016/0190839 | A1 * | 6/2016 | Otsuka | G06F 1/266 |
| | | | | 320/115 |
| 2016/0320830 | A1 | 11/2016 | Jakoboski et al. | |
| 2017/0013876 | A1 * | 1/2017 | Schennum | A24F 40/95 |
| 2017/0052610 | A1 * | 2/2017 | Large | G06F 3/0485 |
| 2017/0222456 | A1 | 8/2017 | Perez et al. | |
| 2018/0024657 | A1 * | 1/2018 | Ninomiya | G06F 3/033 |
| | | | | 345/179 |
| 2019/0243474 | A1 * | 8/2019 | Oda | G06F 3/03545 |
| 2019/0379959 | A1 * | 12/2019 | Kim | H04R 3/005 |
| 2020/0044482 | A1 * | 2/2020 | Partovi | H02J 50/12 |
| 2020/0052520 | A1 * | 2/2020 | Kang | G06F 1/1656 |
| 2020/0110475 | A1 * | 4/2020 | Files | G06F 1/1656 |
| 2020/0174529 | A1 * | 6/2020 | Goh | G06F 3/0416 |
| 2020/0209992 | A1 * | 7/2020 | Kwak | H04W 4/40 |
| 2020/0285279 | A1 | 9/2020 | Zimmerman et al. | |
| 2021/0099025 | A1 * | 4/2021 | Gaule | H02J 7/0044 |
| 2021/0116962 | A1 * | 4/2021 | Lee | G06F 1/1652 |
| 2021/0247856 | A1 * | 8/2021 | Wang | G06F 3/03547 |
| 2021/0265861 | A1 * | 8/2021 | Moussaoui | H02J 50/12 |
| 2021/0325933 | A1 * | 10/2021 | Mehandjiysky | H02J 7/0044 |
| 2021/0399577 | A1 * | 12/2021 | Qiu | H01F 38/14 |
| 2022/0094201 | A1 * | 3/2022 | Haug | H02J 7/0044 |
| 2022/0115909 | A1 * | 4/2022 | Partovi | H02J 7/0047 |
| 2022/0155878 | A1 | 5/2022 | Park et al. | |
| 2022/0413547 | A1 * | 12/2022 | Sung | G06F 1/1681 |
| 2023/0106903 | A1 * | 4/2023 | Wallace | G06F 1/1654 |
| | | | | 345/168 |
| 2023/0179019 | A1 * | 6/2023 | Wu | H02J 50/402 |
| | | | | 320/114 |
| 2023/0221813 | A1 * | 7/2023 | Jia | H02J 50/90 |
| | | | | 345/179 |
| 2024/0061520 | A1 * | 2/2024 | Wang | G06F 3/0386 |

FOREIGN PATENT DOCUMENTS

| | | | | | |
|---|---|---|---|---|---|
| CN | 104115089 | A | | 10/2014 | |
| CN | 107045395 | A | * | 8/2017 | .......... G06F 1/1618 |
| CN | 107533382 | A | * | 1/2018 | ........ G06F 3/03545 |
| CN | 207067941 | U | | 3/2018 | |
| CN | 207281719 | U | | 4/2018 | |
| CN | 209895309 | U | | 1/2020 | |
| CN | 210199712 | U | | 3/2020 | |
| CN | 111033449 | A | | 4/2020 | |
| CN | 111813246 | A | | 10/2020 | |
| CN | 112135212 | A | | 12/2020 | |
| CN | 212256262 | U | | 12/2020 | |
| CN | 112166401 | A | | 1/2021 | |
| CN | 212661307 | U | | 3/2021 | |
| CN | 112698733 | A | | 4/2021 | |
| CN | 113253855 | A | | 8/2021 | |
| CN | 113922513 | A | * | 1/2022 | .......... H02J 50/502 |
| JP | 2016126412 | A | | 7/2016 | |
| KR | 101976361 | B1 | | 5/2019 | |
| KR | 20200015979 | A | | 2/2020 | |
| WO | 2021025493 | A1 | | 2/2021 | |

* cited by examiner

ELECTRONIC DEVICE COMPONENT

CROSS-REFERENCE TO RELATED APPLICATIONS

This is a continuation of U.S. patent application Ser. No. 17/798,037, filed on Aug. 5, 2022, which is a U.S. National Stage of International Application No. PCT/CN2022/072176, filed on Jan. 14, 2022, which claims priority to Chinese Patent Application No. 202110293428.X, filed on Mar. 15, 2021 and Chinese Patent Application No. 202110379835.2, filed on Apr. 8, 2021. All of the aforementioned applications are hereby incorporated by reference in their entireties.

TECHNICAL FIELD

Embodiments of this application relate to terminal technologies, and in particular, to an electronic device component.

BACKGROUND

With explosive growth of smartphones and tablets (tablets), a stylus is gradually widely used, and a performance requirement of the stylus is also increasingly higher. According to different working principles, the stylus mainly includes an inductive stylus and a capacitive stylus, and the capacitive stylus includes an active capacitive stylus and a passive capacitive stylus.

Currently, the active capacitive stylus is provided with an electrode and a circuit board. The stylus is usually provided with a rechargeable battery to provide power for the circuit board. The stylus is provided with a wireless charging coil to charge the battery. The stylus can be adsorbed at a fixed location of another electronic product (such as a tablet or a wireless keyboard). A wireless charging coil is disposed at the fixed location of the tablet or the wireless keyboard. When the stylus is adsorbed at the fixed location of the tablet or the wireless keyboard, the wireless charging coil of the tablet or the wireless keyboard may be coupled to the wireless charging coil of the stylus to wirelessly charge the battery in the stylus.

However, when the stylus is adsorbed at the fixed location of the tablet or the wireless keyboard for charging, the wireless charging coil of the stylus needs to be aligned with the wireless charging coil at the fixed location of the tablet or the wireless keyboard to implement charging. Consequently, a user needs to align the two wireless charging coils for a plurality of times, and therefore the user cannot quickly complete a charging operation of the stylus.

SUMMARY

Embodiments of this application provide an electronic device component, so that a stylus can be charged when the stylus is blindly inserted into an accommodating portion, to resolve a prior-art problem that a user cannot quickly charge the stylus because charging coils need to be aligned for a plurality of times when the stylus is charged.

An embodiment of this application provides an electronic device component, including at least:

a wireless keyboard and a stylus, where the wireless keyboard includes an accommodating portion for accommodating the stylus, a first charging coil is disposed on an inner wall of the accommodating portion, and a second charging coil corresponding to the first charging coil is disposed in the stylus.

At least one of the first charging coil and the second charging coil is a circle coil, and the circle coil is disposed around circumference of the accommodating portion or the stylus.

The first charging coil is disposed in the accommodating portion of the wireless keyboard, and the second charging coil is disposed in the stylus. When the stylus is accommodated in the accommodating portion, a location of the first charging coil corresponds to a location of the second charging coil, at least one of the first charging coil and the second charging coil is a circle coil, and the circle coil is disposed around the circumference of the accommodating portion or the stylus. In this way, when the stylus is blindly inserted into the accommodating portion, the circle coil in the first charging coil and the second charging coil is always coupled to the other charging coil, to implement a function of 360° blind insertion charging of the stylus, and avoid an operation of alignment between the wireless charging coil of the stylus and the wireless charging coil of an electronic device when the stylus is charged. In addition, the stylus can be accommodated in the accommodating portion of the wireless keyboard, so that the stylus can be carried more portably. Therefore, according to the wireless keyboard and the stylus provided in this embodiment of this application, the stylus can be charged when the stylus is blindly inserted into the accommodating portion, to resolve a prior-art problem that a user cannot quickly charge the stylus because the charging coils need to be aligned for a plurality of times when the stylus is charged.

In a possible implementation, the accommodating portion is a cavity, and one end of the cavity having an opening through which the stylus can be inserted into the cavity.

In a possible implementation, the circle coil is a 360° continuous circle coil, or the circle coil is a non-closed circle coil.

In a possible implementation, the electronic device component further includes: at least one group of limiting components, where the limiting component is configured to limit a location of the stylus in the accommodating portion.

In a possible implementation, the limiting component includes a first ring magnet and a magnetic piece attracted to the first ring magnet; and one of the first ring magnet and the magnetic piece is located on the inner wall of the accommodating portion, and the other of the first ring magnet and the magnetic piece is located in the stylus.

In a possible implementation, there are two groups of limiting components, and two first ring magnets in the two groups of limiting components are respectively located on two sides of the first charging coil; and two magnetic pieces in the two groups of limiting components are respectively located on two sides of the second charging coil.

In a possible implementation, the limiting component includes: an elastic buckle and a buckle groove connected to the elastic buckle, one of the elastic buckle and the buckle groove is disposed on the inner wall of the accommodating portion, and the other of the elastic buckle and the buckle groove is disposed on the stylus; and one of the elastic buckle and the buckle groove is an annular structure.

In a possible implementation, the electronic device component further includes: an elastic pressing component, where the elastic pressing component is located in the accommodating portion, and one end of the elastic pressing component is in contact with a stylus tip of the stylus when the stylus is accommodated in the accommodating portion; and the elastic pressing component is configured to: be compressed when the stylus is accommodated in the accommodating portion, and drive the stylus to eject outward after one end of the stylus is pressed.

In a possible implementation, the electronic device component further includes: a sensing component, where the sensing component is configured to be triggered when the stylus is properly inserted into the accommodating portion, so that the stylus starts to be charged.

In a possible implementation, the sensing component is a pressure sensor, the pressure sensor is located in the accommodating portion, the pressure sensor is in contact with one end of the elastic pressing component, and the pressure sensor is configured to detect a magnitude of pressure applied when the elastic pressing component is compressed.

In a possible implementation, the sensing component is an infrared sensor, the infrared sensor is disposed in the accommodating portion, and the infrared sensor is close to one end that is of the elastic pressing component and that faces the stylus tip of the stylus.

In a possible implementation, the sensing component includes: a second ring magnet and a Hall sensor corresponding to the second ring magnet, where one of the second ring magnet and the Hall sensor is disposed on the inner wall of the accommodating portion, and the other of the second ring magnet and the Hall sensor is disposed in the stylus.

In a possible implementation, the second ring magnet is a 360° ring magnet, or the second ring magnet is a non-closed ring magnet formed by two semicircular ring magnets disposed alternately.

In a possible implementation, the wireless keyboard includes: a keyboard body and a support, where the keyboard body and the support are rotatably connected through a connecting portion, and the accommodating portion is located on the connecting portion, or the accommodating portion is located in the connecting portion, or the accommodating portion is disposed close to the connecting portion.

In a possible implementation, the connecting portion is a rotating shaft, the rotating shaft is connected to the keyboard body, the support is rotatably connected to the rotating shaft, or the rotating shaft is connected to the support, and the keyboard body is rotatably connected to the rotating shaft.

In a possible implementation, the electronic device component further includes: a charging indication module, where the charging indication module is configured to perform an indication when the wireless keyboard charges the stylus.

In a possible implementation, the electronic device component further includes: an electronic device, where the electronic device includes a touchscreen, the charging indication module is located in the electronic device, and the charging indication module includes a charging display unit; and the charging display unit is configured to display a charging status of the stylus through the touchscreen when the wireless keyboard charges the stylus; or the charging indication module is disposed on the wireless keyboard, the charging indication module includes an indicator, and the indicator indicates a charging status of the stylus.

DESCRIPTION OF EMBODIMENTS

Figure 1:
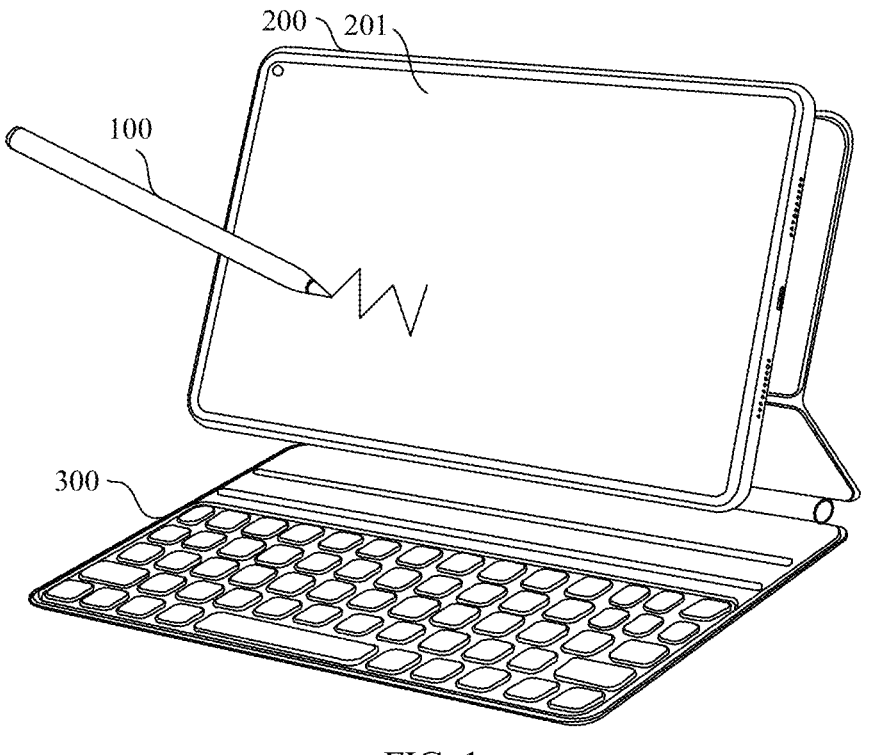
FIG. 1 is a schematic diagram of a scenario to which an embodiment of this application is applicable.

FIG. 1 is a schematic diagram of a scenario to which an embodiment of this application is applicable. Refer to FIG. 1. The scenario includes a stylus (stylus) 100, an electronic device 200, and a wireless keyboard 300. In FIG. 1, an example in which the electronic device 200 is a tablet (tablet) is used for description. The stylus 100 and the wireless keyboard 300 may provide an input to the electronic device 200. The electronic device 200 performs an operation in response to the input based on the input of the stylus 100 or the wireless keyboard 300. A touch area may be disposed on the wireless keyboard 300. The stylus 100 may operate the touch area of the wireless keyboard 300 to provide an input to the wireless keyboard 300, and the wireless keyboard 300 may perform an operation in response to the input based on the input of the stylus 100. In an embodiment, the stylus 100 and the electronic device 200, the stylus 100 and the wireless keyboard 300, and the electronic device 200 and the wireless keyboard 300 may be interconnected through a communication network, to implement interaction between wireless signals. The communication network may include but is not limited to the following: a Wi-Fi hotspot network, a Wi-Fi peer-to-peer (peer-to-peer, P2P) network, a Bluetooth network, a ZigBee network, or a near field communication (near field communication, NFC) network.

The stylus 100 may include but is not limited to the following: an inductive stylus and a capacitive stylus. The electronic device 200 includes a touchscreen 201. When the stylus 100 is the inductive stylus, an electromagnetic induction board needs to be integrated on the touchscreen 201 of the electronic device 200 interacting with the stylus 100. A coil is distributed on the electromagnetic induction board, and a coil is also integrated in the inductive stylus. According to an electromagnetic induction principle, the inductive stylus can accumulate electric energy with movement of the inductive stylus in a magnetic field range generated by the electromagnetic induction board. The inductive stylus can transmit the accumulated electric energy to the electromagnetic induction board through the coil in the inductive stylus and free oscillation. The electromagnetic induction board may scan the coil on the electromagnetic induction board based on the electric energy from the inductive stylus, and calculate a location of the inductive stylus on the touchscreen 201. The touchscreen 201 of the electronic device 200 may also be referred to as a touchscreen 201, and the stylus 100 may be referred to as a stylus.

The capacitive stylus may include: a passive capacitive stylus and an active capacitive stylus. The passive capacitive stylus may be referred to as a passive capacitive stylus, and the active capacitive stylus may be referred to as an active capacitive stylus.

One or more electrodes may be disposed in the active capacitive stylus (for example, a stylus tip). The active capacitive stylus may transmit a signal through the electrode. When the stylus 100 is the active capacitive stylus, an electrode array needs to be integrated on the touchscreen 201 of the electronic device 200 interacting with the stylus 100. In an embodiment, the electrode array may be a capacitive electrode array. The electronic device 200 may receive a signal from the active capacitive stylus through the electrode array, and when receiving the signal, identify a location of the active capacitive stylus on the touchscreen and an inclination angle of the active capacitive stylus based on a change in a capacitance value on the touchscreen 201.

Figure 2A:
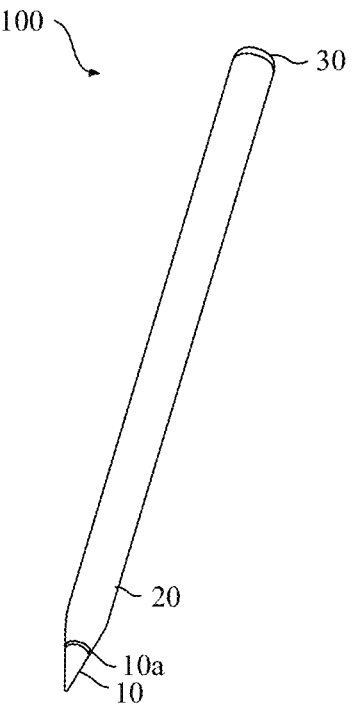
FIG. 2A is a schematic diagram of a structure of a stylus according to an embodiment of this application.

FIG. 2A is a schematic diagram of a structure of a stylus. Refer to FIG. 2A. The stylus 100 may include a stylus tip 10, a stylus rod 20, and a rear cover 30. The inside of the stylus rod 20 is in a hollow structure. The stylus tip 10 and the rear cover 30 are respectively located at two ends of the stylus rod 20. The rear cover 30 and the stylus rod 20 may be connected through plugging or snapping. For a fitting relationship between the stylus tip 10 and the stylus rod 20, refer to descriptions in FIG. 2B.

Figure 2B:
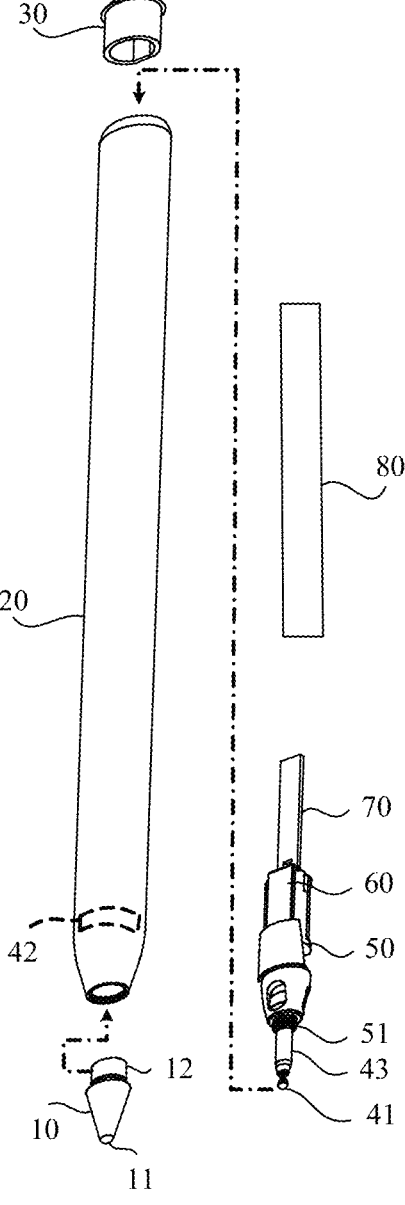
FIG. 2B is a schematic diagram of a partially split structure of a stylus according to an embodiment of this application.

FIG. 2B is a schematic diagram of a partially split structure of a stylus. Refer to FIG. 2B. The stylus 100 further includes a spindle component 50. The spindle component 50 is located in the stylus rod 20, and the spindle component 50 is slidably disposed in the stylus rod 20. The spindle component 50 has an external screw thread 51, and the stylus tip 10 includes a writing end 11 and a connecting end 12. The connecting end 12 of the stylus tip 10 has an internal screw thread (not shown) fitting the external screw thread 51.

When the spindle component 50 is assembled into the stylus rod 20, the connecting end 12 of the stylus tip 10 extends into the stylus rod 20 and is threadedly connected to the external screw thread 51 of the spindle component 50. In some other examples, the connecting end 12 of the stylus tip 10 may also be connected to the spindle component 50 in a detachable manner such as snapping. The connecting end 12 of the stylus tip 10 is detachably connected to the spindle component 50, to implement replacement of the stylus tip 10.

To detect pressure applied to the writing end 11 of the stylus tip 10, as shown in FIG. 2A, there is a gap 10*a* between the stylus tip 10 and the stylus rod 20. In this way, it can be ensured that when the writing end 11 of the stylus tip 10 is subjected to an external force, the stylus tip 10 can move toward the stylus rod 20, and movement of the stylus tip 10 drives the spindle component 50 to move in the stylus rod 20. To detect the pressure, as shown in FIG. 2B, a pressure sensing component 60 is disposed on the spindle component 50. A part of the pressure sensing component 60 is fixedly connected to a fastener in the stylus rod 20, and a part of the pressure sensing component 60 is fixedly connected to the spindle component 50. In this way, when the spindle component 50 moves with the stylus tip 10, because the part of the pressure sensing component 60 is fixedly connected to the fastener in the stylus rod 20, movement of the spindle component 50 drives deformation of the pressure sensing component 60, and deformation of the pressure sensing component 60 is transmitted to a circuit board 70 (for example, the pressure sensing component 60 and the circuit board 70 can be electrically connected through a wire or a flexible circuit board). The circuit board 70 detects the pressure of the writing end 11 of the stylus tip 10 based on deformation of the pressure sensing component 60, and therefore controls a line thickness of the writing end 11 based on the pressure of the writing end 11 of the stylus tip 10.

It should be noted that detection on the pressure of the stylus tip 10 includes but is not limited to the foregoing method. For example, a pressure sensor may be further disposed at the writing end 11 of the stylus tip 10, and the pressure of the stylus tip 10 is detected by the pressure sensor.

In this embodiment, as shown in FIG. 2B, the stylus 100 further includes a plurality of electrodes. The plurality of electrodes may be, for example, a first transmitting electrode 41, a ground electrode 43, and a second transmitting electrode 42. The first transmitting electrode 41, the ground electrode 43, and the second transmitting electrode 42 are electrically connected to the circuit board 70. The first transmitting electrode 41 may be located in the stylus tip 10 and close to the writing end 11. The circuit board 70 may be configured to provide a signal control board to each of the first transmitting electrode 41 and the second transmitting electrode 42, and the first transmitting electrode 41 is configured to transmit a first signal. When the first transmitting electrode 41 is close to the touchscreen 201 of the electronic device 200, a coupling capacitance may be formed between the first transmitting electrode 41 and the touchscreen 201 of the electronic device 200, so that the electronic device 200 can receive the first signal. The second transmitting electrode 42 is configured to transmit a second signal, and the electronic device 200 can determine an inclination angle of the stylus 100 based on the received second signal. In this embodiment of this application, the second transmitting electrode 42 may be located on an inner wall of the stylus rod 20. In an example, the second transmitting electrode 42 may also be located on the spindle component 50.

The ground electrode 43 may be located between the first transmitting electrode 41 and the second transmitting electrode 42, or the ground electrode 43 may be located at the outer periphery of the first transmitting electrode 41 and the second transmitting electrode 42, and the ground electrode 43 is used to reduce coupling between the first transmitting electrode 41 and the second transmitting electrode 42.

When the electronic device 200 receives a first signal from the stylus 100, a capacitance value at a corresponding location on the touchscreen 201 changes. Based on this, the electronic device 200 may determine a location of the stylus 100 (or the stylus tip of the stylus 100) on the touchscreen 201 based on the change in the capacitance value on the touchscreen 201. In addition, the electronic device 200 may obtain the inclination angle of the stylus 100 by using a double-tip projection method in an inclination angle detection algorithm. Because locations of the first transmitting electrode 41 and the second transmitting electrode 42 in the stylus 100 are different, when the electronic device 200 receives the first signal and a second signal from the stylus 100, capacitance values at the two locations on the touchscreen 201 change. The electronic device 200 may obtain the inclination angle of the stylus 100 based on a distance between the first transmitting electrode 41 and the second transmitting electrode 42 and a distance between the two locations at which the capacitance values on the touchscreen 201 change. For more detailed descriptions of obtaining the inclination angle of the stylus 100, refer to related descriptions of the double-tip projection method in the conventional technology.

In this embodiment of this application, as shown in FIG. 2B, the stylus 100 further includes: a battery 80, where the battery 80 is configured to supply power to the circuit board 70. The battery 80 may include a lithium ion battery, or the battery 80 may include a nickel chromium battery, an alkaline battery, a nickel hydrogen battery, or the like. In an embodiment, the battery included in the battery 80 may be a rechargeable battery or a primary battery. When the battery included in the battery 80 may be the rechargeable battery, the stylus 100 can charge the battery in the battery 80 through wireless charging.

Figure 3:
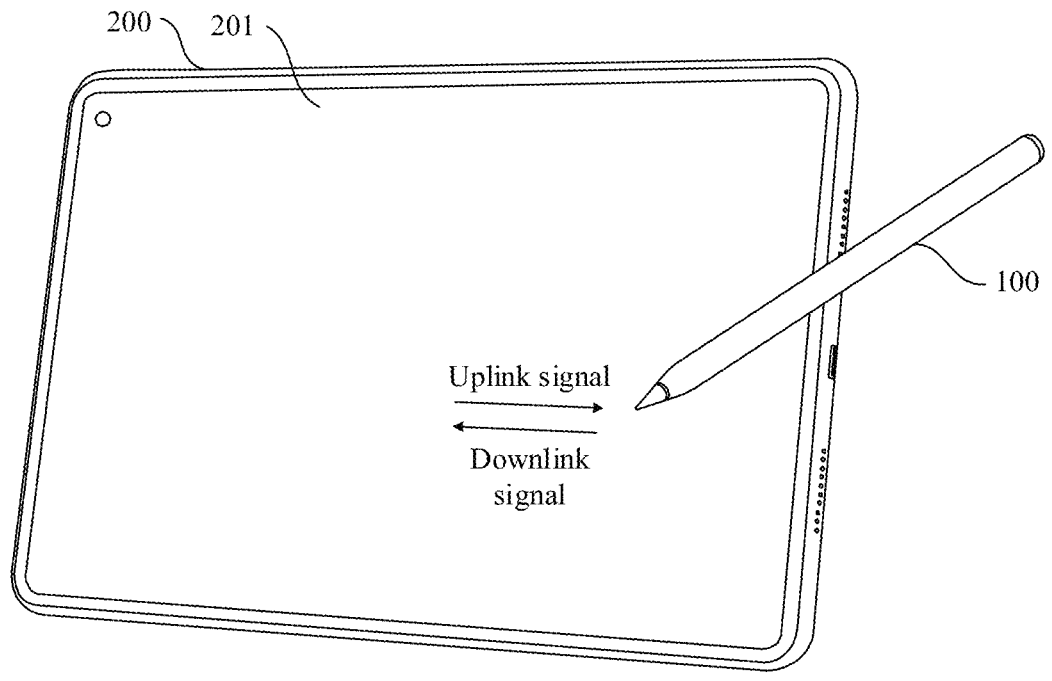
FIG. 3 is a schematic diagram of interaction between a stylus and an electronic device according to an embodiment of this application.

When the stylus 100 is an active capacitive stylus, as shown in FIG. 3, after the electronic device 200 is wirelessly connected to the stylus 100, the electronic device 200 may send an uplink signal to the stylus 100 through an electrode array integrated on the touchscreen 201. The stylus 100 may receive the uplink signal through a receiving electrode, and the stylus 100 transmits a downlink signal through a transmitting electrode (for example, the first transmitting electrode 41 and the second transmitting electrode 42). The downlink signal includes the first signal and the second signal. When the stylus tip 10 of the stylus 100 contacts the touchscreen 201, the capacitance value at the corresponding location on the touchscreen 201 changes, and the electronic device 200 may determine a location of the stylus tip 10 of the stylus 100 on the touchscreen 201 based on the capacitance value on the touchscreen 201. In an embodiment, an uplink signal and a downlink signal may be square wave signals.

Figure 4:
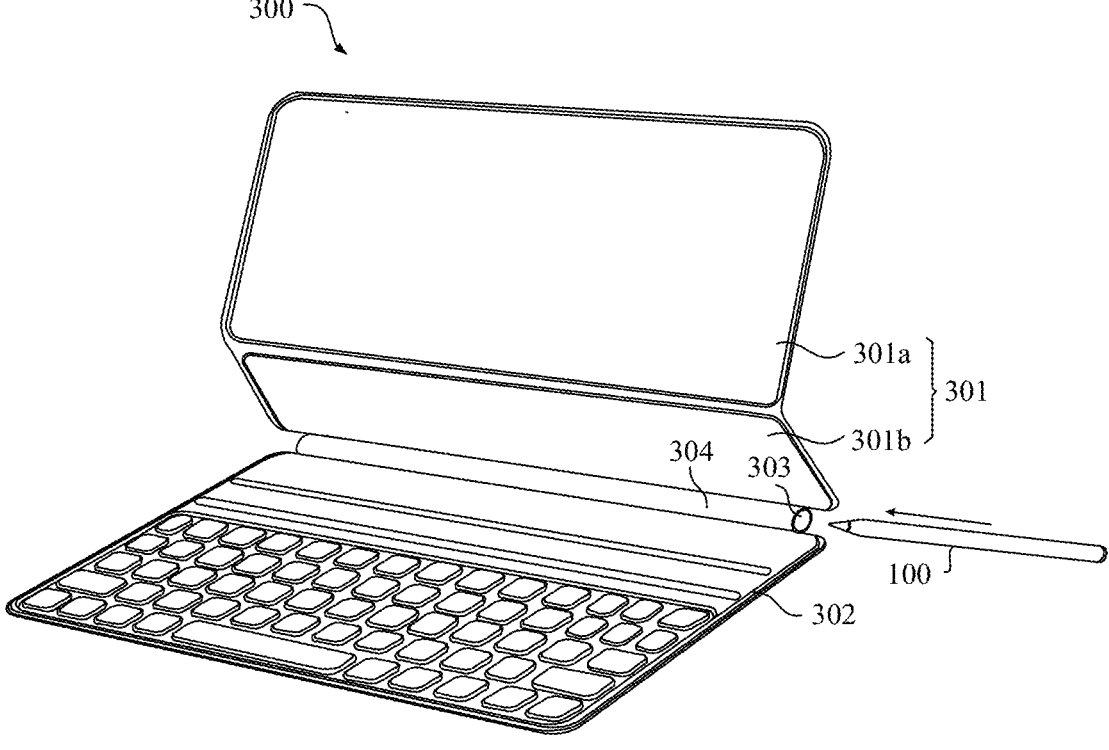
FIG. 4 is a schematic diagram of assembly of a stylus and a wireless keyboard according to an embodiment of this application.

In an embodiment, as shown in FIG. 4, the wireless keyboard 300 may include a support 301 and a keyboard body 302. The support 301 is configured to place the electronic device 200, and the keyboard body 302 may be provided with a button, a touchpad, or the like for a user operation.

When the wireless keyboard 300 is used, the support 301 and the keyboard body 302 of the wireless keyboard 300 need to be opened. When the wireless keyboard 300 is not used, the support 301 and the keyboard body 302 of the wireless keyboard 300 can be closed. In an embodiment, the support 301 and the keyboard body 302 of the wireless keyboard 300 are rotatably connected to each other. For example, the support 301 and the keyboard body 302 may be connected through a rotating shaft or a hinge. Alternatively, in some examples, the support 301 and the keyboard body 302 are rotationally connected by using a flexible material (for example, a leather material or a cloth material). Alternatively, in some examples, the support 301 and the keyboard body 302 may be integrally formed, and a connection part between the support 301 and the keyboard body 302 is thinned, so that the connection part between the support 301 and the keyboard body 302 can be bent. A manner of the connection between the support 301 and the keyboard body 302 may include but is not limited to the foregoing rotational connection manners.

The support 301 may include at least two rotationally connected supports. For example, as shown in FIG. 4, the support 301 includes a first support 301a and a second support 301b. The first support 301a and the second support 301b are rotatably connected to each other. During use, the first support 301a and the second support 301b may be used to jointly support the electronic device 200 (for details, refer to FIG. 1). Alternatively, the first support 301a supports the second support 301b, and the second support 301b supports the electronic device 200. Refer to FIG. 4. The second support 301b and the keyboard body 302 are rotatably connected to each other.

As shown in FIG. 4, to accommodate the stylus 100, the wireless keyboard 300 may be provided with an accommodating portion 303 for accommodating the stylus 100. As shown in FIG. 4, the accommodating portion 303 is a cylindrical cavity, and one end of the cavity has an opening through which the stylus can be inserted into the cavity. During accommodating, the stylus 100 is inserted into the accommodating cavity along an arrow direction in FIG. 4.

In this embodiment, as shown in FIG. 4, the keyboard body 302 and the second support 301b are rotatably connected to each other through a connecting portion 304. In FIG. 4, the accommodating portion 303 is formed in the connecting portion 304. The connecting portion 304 may be a rotating shaft, the rotating shaft is fixedly connected to the keyboard body 302, and the support 301 is rotatably connected to the rotating shaft. For example, the support 301 includes a sleeve (not shown) sleeved on the rotating shaft, and the support 301 is rotatably connected to the rotating shaft through the sleeve. Alternatively, the rotating shaft is fixedly connected to the support 301, and the keyboard body 302 is rotatably connected to the rotating shaft.

When the connecting portion 304 may be a rotating shaft, a cavity may be disposed in the rotating shaft to form the accommodating portion 303.

Certainly, in some examples, the accommodating portion 303 may alternatively be disposed on a surface of the connecting portion 304, or the accommodating portion 303 may be disposed close to the connecting portion 304. It should be noted that when the accommodating portion 303 is disposed close to the connecting portion 304, a stylus container may be disposed at a location that is on the wireless keyboard 300 and that is near the connecting portion 304, and the accommodating portion 303 may be formed in the stylus container.

Figure 5A:
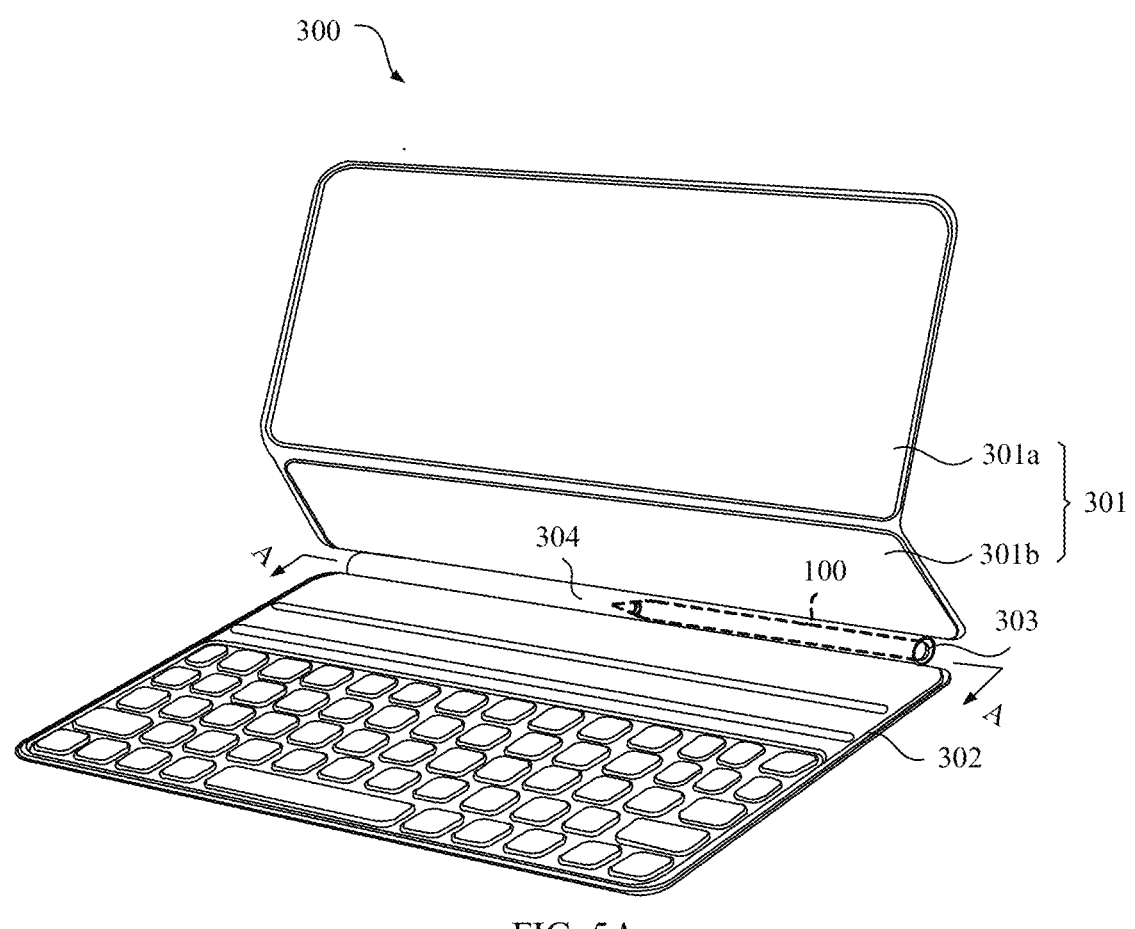
FIG. 5A is a schematic diagram in which a stylus is accommodated in an accommodating portion of a wireless keyboard according to an embodiment of this application.
Figure 5B:
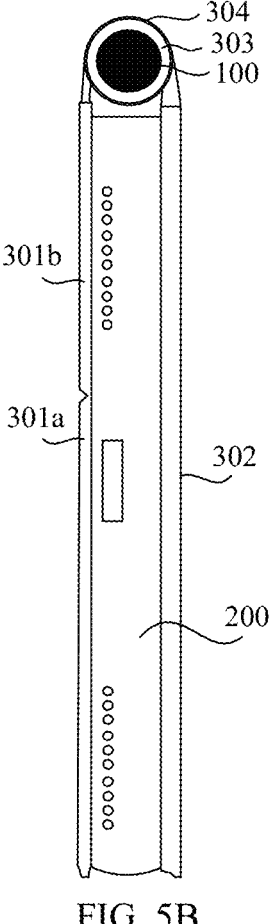
FIG. 5B is a schematic side view of an electronic device, a stylus, and a wireless keyboard according to an embodiment of this application.

FIG. 5A is a schematic diagram in which a stylus 100 is accommodated in an accommodating portion 303. FIG. 5B is a schematic side view obtained when a stylus 100 is accommodated in an accommodating portion 303 of a wireless keyboard 300. Refer to FIG. 5B. The accommodating portion 303 is a circular cavity, and an inner diameter of the accommodating portion 303 is larger than an outer diameter of the stylus 100.

In an embodiment, a magnetic material may be disposed on an inner wall of the accommodating portion 303, and a magnetic material may be disposed in the stylus 100, to prevent the stylus 100 from falling out of the accommodating portion 303. The stylus 100 is adsorbed in the accommodating portion 303 through magnetic adsorption between the magnetic materials. Certainly, in some examples, when the stylus 100 is fastened to the accommodating portion 303, the stylus 100 is fastened to the accommodating portion 303 through magnetic adsorption or the like. For example, the stylus 100 may also be fastened to the accommodating portion 303 through snapping.

To facilitate removal of the stylus 100 from the accommodating portion 303, an elastic pressing component (for details, refer to descriptions in FIG. 13B) may be disposed in the accommodating portion 303. For example, one end of the stylus 100 is pressed, so that the elastic pressing component can drive one end of the stylus 100 to eject from the accommodating portion 303.

Figures 6, 7:
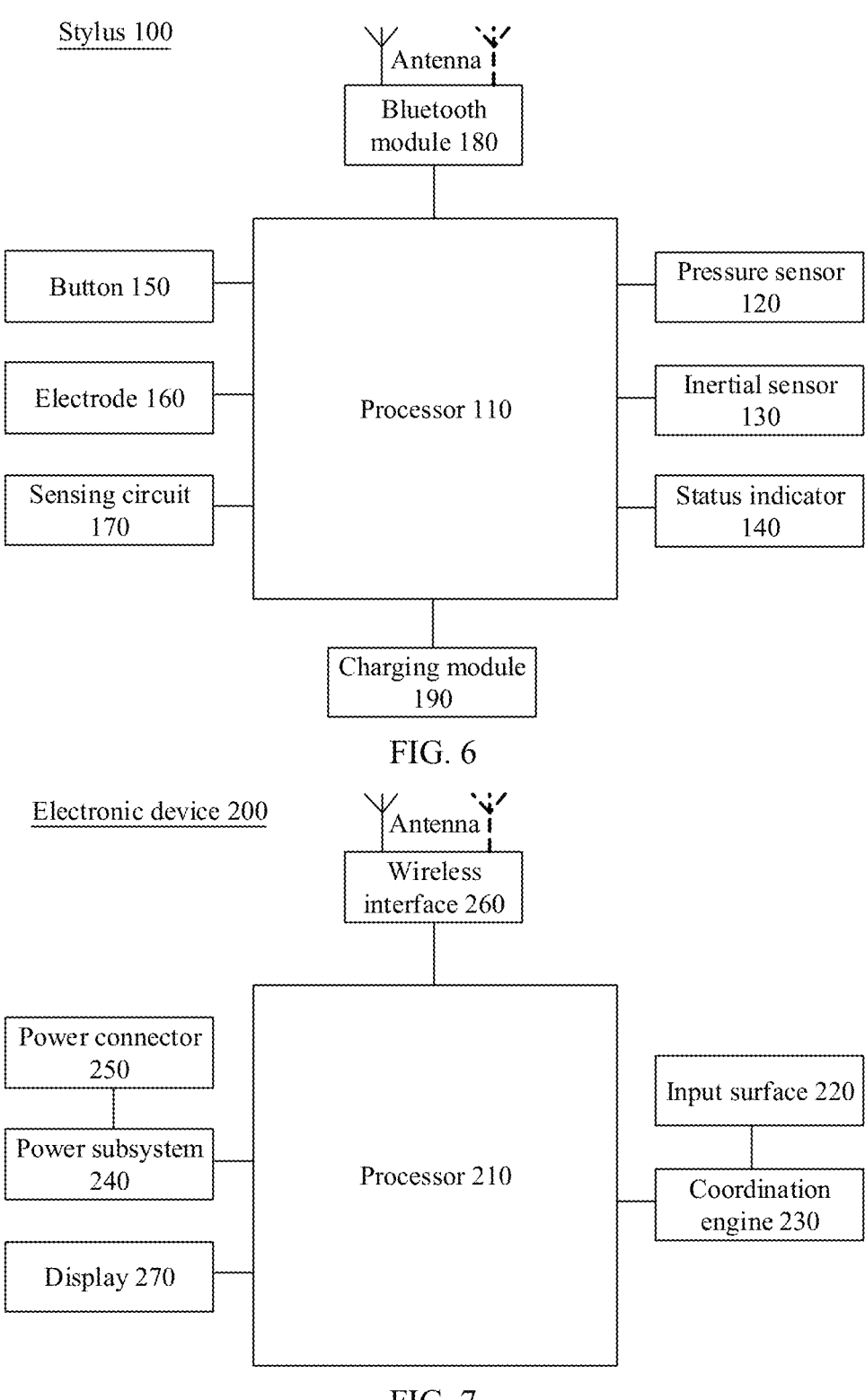
FIG. 6 is a schematic diagram of a hardware structure of a stylus according to an embodiment of this application.
FIG. 7 is a schematic diagram of a hardware structure of an electronic device according to an embodiment of this application.

FIG. 6 is a schematic diagram of a hardware structure of a stylus according to an embodiment of this application. Refer to FIG. 6. The stylus 100 may include a processor 110. The processor 110 may include storage and processing circuits configured to support operations of the stylus 100. The storage and processing circuits may include a storage apparatus (for example, a flash memory or another electrical programmable read-only memory configured as a solid-state drive) such as a non-volatile memory, a volatile memory (for example, a static or dynamic random access memory), and the like. The processing circuit in the processor 110 may be used to control an operation of the stylus 100. The processing circuit may be based on one or more microprocessors, microcontrollers, digital signal processors, baseband processors, power management units, audio chips, application-specific integrated circuits, and the like.

The stylus 100 may include one or more sensors. For example, the sensor may include a pressure sensor 120. The pressure sensor 120 may be disposed at the writing end 11 of the stylus 100 (as shown in FIG. 2B). Certainly, the pressure sensor 120 may also be disposed in the stylus rod 20 of the stylus 100. In this way, after one end of the stylus tip 10 of the stylus 100 is forced, the other end of the stylus tip 10 moves to apply force to the pressure sensor 120. In an embodiment, the processor 110 may adjust, based on pressure detected by the pressure sensor 120, a writing line thickness of the stylus tip 10 of the stylus 100.

The sensor may also include an inertial sensor 130. The inertial sensor 130 may include a three-axis accelerometer and a three-axis gyroscope, and/or another component configured to measure movement of the stylus 100. For example, a three-axis magnetometer may be included in the sensor in a configuration of a nine-axis inertial sensor. The sensor may also include an additional sensor, such as a temperature sensor, an ambient light sensor, an optical proximity sensor, a contact sensor, a magnetic sensor, a pressure sensor, and/or another sensor.

The stylus 100 may include a status indicator 140 such as a light-emitting diode and a button 150. The status indicator 140 is configured to prompt a user with a status of the stylus 100. The button 150 may include a mechanical button and a non-mechanical button, and the button 150 may be configured to collect button press information from the user.

In this embodiment of this application, the stylus 100 may include one or more electrodes 160 (for details, refer to the descriptions in FIG. 2B), one electrode 160 may be located at the writing end of the stylus 100, and one electrode 160 may be located in the stylus tip 10. For details, refer to the foregoing related descriptions.

The stylus 100 may include a sensing circuit 170. The sensing circuit 170 may sense capacitive coupling between the electrode 160 and a drive line on a capacitive touch sensor panel interacting with the stylus 100. The sensing circuit 170 may include an amplifier used to receive capacitive readings from the capacitive touch sensor panel, a clock used to generate a demodulation signal, a phase shifter used to generate a phase-shifted demodulation signal, a mixer used to demodulate capacitive readings by using an in-phase demodulation frequency component, a mixer used to demodulate capacitive readings by using a quadrature demodulation frequency component, and the like. A demodulation result of the mixer may be used to determine an amplitude proportional to a capacitance, so that the stylus 100 can sense contact with the capacitive touch sensor panel.

It may be understood that the stylus 100 may include a microphone, a speaker, an audio generator, a vibrator, a camera, a data port, and another device based on an actual requirement. The user may use these devices to provide commands to control operations of the stylus 100 and the electronic device 200 interacting with the stylus 100, and receive status information and another output.

The processor 110 may be configured to run software that is on the stylus 100 and that controls an operation of the stylus 100. In an operation process of the stylus 100, the software running on the processor 110 may process a sensor input, a button input, and an input from another apparatus to monitor movement of the stylus 100 and an input of another user. The software running on the processor 110 may detect a user command and may communicate with the electronic device 200.

To support wireless communication between the stylus 100 and the electronic device 200, the stylus 100 may include a wireless module. In FIG. 6, an example in which the wireless module is a Bluetooth module 180 is used for description. The wireless module may also be a Wi-Fi hotspot module, a Wi-Fi peer-to-peer module, or the like. The Bluetooth module 180 may include a radio frequency transceiver, for example, a transceiver. The Bluetooth module 180 may also include one or more antennas. The transceiver may transmit and/or receive a wireless signal through the antenna. The wireless signal may be a Bluetooth signal, a wireless local area network signal, a remote signal such as a cellular phone signal, a near field communication signal, or another wireless signal based on a type of the wireless module.

The stylus 100 may further include a charging module 190. The charging module 190 may support charging of the stylus 100 to provide power to the stylus 100.

It should be understood that the electronic device 200 in this embodiment of this application may be referred to as user equipment (user equipment, UE), a terminal (terminal), or the like. For example, the electronic device 200 may be a mobile terminal or a fixed terminal including a touch-screen, for example, a tablet (portable android device, PAD), a personal digital assistant (personal digital assistant, PDA), a handheld device having a wireless communication function, a computing device, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). A form of the terminal device is not specifically limited in this embodiment of this application.

FIG. 7 is a schematic diagram of a hardware structure of an electronic device according to an embodiment of this application. Refer to FIG. 7. The electronic device 200 may include a plurality of subsystems. The subsystems cooperate to perform, coordinate, or monitor one or more operations or functions of the electronic device 200. The electronic device 200 includes a processor 210, an input surface 220, a coordination engine 230, a power subsystem 240, a power connector 250, a wireless interface 260, and a display 270.

For example, the coordination engine 230 may be configured to: communicate with another subsystem of the electronic device 200 and/or process data; communicate with and/or transact data with the stylus 100; measure and/or obtain one or more outputs of one or more analog or digital sensors (for example, touch sensors); measure and/or obtain one or more outputs of one or more sensor nodes in a sensor node array (for example, a capacitive sensing node array); receive and position a tip signal and a ring signal from the stylus 100; position the stylus 100 based on locations of a tip signal crossing area and a ring signal crossing area, and the like.

The coordination engine 230 of the electronic device 200 includes or may be communicatively coupled, in another manner, to a sensor layer located below the input surface 220 or integrated with the input surface. The coordination engine 230 uses the sensor layer to position the stylus 100 on the input surface 220, and uses the technology in this specification to estimate an angular location of the stylus 100 relative to a plane of the input surface 220. In an embodiment, the input surface 220 may be referred to as a touch-screen 201.

For example, the sensor layer of the coordination engine 230 of the electronic device 200 is a grid of capacitive sensing nodes arranged in columns and rows. More specifically, a column trace array is set to be perpendicular to a row trace array. The sensor layer may be separated from another layer of the electronic device, or the sensor layer may be disposed directly on another layer. The another layer includes but is not limited to: a display stack layer, a force sensor layer, a digitizer layer, a polarizer layer, a battery layer, a structural or decorative shell layer, or the like.

The sensor layer can operate in a plurality of modes. If the sensor layer operates in mutual capacitance mode, a column trace and a row trace form a single capacitive sensing node (for example, a "vertical" mutual capacitance) at each overlapping point. If the sensor layer operates in self-capacitive mode, a column trace and a row trace form two (vertically aligned) capacitive sensing nodes at each overlapping point. In another implementation solution, if the sensor layer operates in mutual capacitance mode, adjacent column traces and/or adjacent row traces each may form a single capacitive sensing node (for example, a "horizontal" mutual capacitance). As described above, the sensor layer may monitor a change in a capacitance (for example, a mutual capacitance or a self-capacitance) presented at each capacitive sensing node to detect existence of the stylus tip 10 of the stylus 100 and/or touch of a finger of the user. In many cases, the coordination engine 230 may be configured to detect, through capacitive coupling, the tip signal and the ring signal received from the stylus 100 through the sensor layer.

The tip signal and/or the ring signal may include specific information and/or data that may be configured to enable the electronic device 200 to identify the stylus 100. Such information is usually referred to as "stylus identity" information in this specification. The information and/or the data may be received by the sensor layer, and interpreted, decoded, and/or demodulated by the coordination engine 230.

The processor 210 may use the stylus identity information to receive an input from more than one stylus simultaneously. Specifically, the coordination engine 230 may be configured to transmit, to the processor 210, a location and/or an angular location that are/is of each of several styluses and that are/is detected by the coordination engine 230. In another case, the coordination engine 230 may further transmit, to the processor 210, information about relative locations and/or relative angular locations that are of a plurality of styluses and that are detected by the coordination engine 230. For example, the coordination engine 230 may notify that a first stylus detected by the processor 210 is located at a location of a second stylus detected by the processor 210.

In another case, the tip signal and/or the ring signal may further include specific information and/or data used to enable the electronic device 200 to identify a specific user. Such information is usually referred to as "user identity" information in this specification.

The coordination engine 230 may forward the user identity information (if the user identity information can be detected and/or can be restored) to the processor 210. If the user identity information cannot be restored from the tip signal and/or the ring signal, the coordination engine 230 may optionally indicate to the processor 210 that the user identity information is not available. The processor 210 can use the user identity information in any proper manner (or a case in which the information does not exist), including but not limited to: accepting or rejecting an input from a specific user, allowing or denying access to a specific function of the electronic device, and the like. The processor 210 may use the user identity information to receive an input from more than one user simultaneously.

In another case, the tip signal and/or the ring signal may include specific information and/or data that may be configured to enable the electronic device 200 to identify settings or preferences of the user or the stylus 100. Such information is usually referred to as "stylus setting" information in this specification.

The coordination engine 230 may forward the stylus setting information (if the stylus setting information can be detected and/or can be restored) to the processor 210. If the stylus setting information cannot be restored from the tip signal and/or the ring signal, the coordination engine 230 may optionally indicate to the processor 210 that the stylus setting information is not available. The electronic device 200 can use the stylus setting information in any proper manner (or a case in which the information does not exist), including but not limited to: applying settings to the electronic device, applying settings to a program running on the electronic device, changing a line thickness, a color, and a pattern presented by a graphical program on the electronic device, changing settings of a video game operated on the electronic device, and the like.

Usually, the processor 210 may be configured to: perform, coordinate, and/or manage functions of the electronic device 200. Such functions may include but are not limited to: communicating with and/or transacting data with another subsystem of the electronic device 200, communicating with and/or transacting data with the stylus 100, performing data communication and/or transacting data through a wireless interface, performing data communication and/or transacting data through a wired interface, facilitating power exchange through a wireless (for example, inductive or resonant) or wired interface, receiving one or more locations and angular locations of one or more styluses, and the like.

The processor 210 may be implemented as any electronic device that can process, receive, or send data or instructions. For example, the processor may be a microprocessor, a central processing unit, an application-specific integrated circuit, a field programmable gate array, a digital signal processor, an analog circuit, a digital circuit, or a combination of these devices. The processor may be a single-threaded processor or a multi-threaded processor. The processor may be a single-core processor or a multi-core processor.

During use, the processor 210 may be configured to access a memory that stores instructions. The instructions may be configured to enable the processor to perform, coordinate, or monitor one or more operations or functions of the electronic device 200.

The instructions stored in the memory may be configured to: control or coordinate an operation of another component of the electronic device 200. The component includes but is not limited to: another processor, an analog or digital circuit, a volatile or non-volatile memory module, a display, a speaker, a microphone, a rotary input device, a button or another physical input device, a biometric authentication sensor and/or system, a force or touch input/output component, a communications module (for example, a wireless interface and/or a power connector), and/or a tactile feedback device.

The memory may further store electronic data that can be used by the stylus or the processor. For example, the memory may store electronic data or content (such as a media file, a document, and an application), device settings and preferences, a timing signal and a control signal, data, data structures, or databases used for various modules, a file or a configuration related to detection of a tip signal and/or a ring signal, and the like. The memory may be configured as any type of memory. For example, the memory may be implemented as a random access memory, a read-only memory, a flash memory, a removable memory, another type of storage element, or a combination of these devices.

The electronic device 200 further includes the power subsystem 240. The power subsystem 240 may include a battery or another power supply. The power subsystem 240 may be configured to provide power to the electronic device 200. The power subsystem 240 may be further coupled to the power connector 250. The power connector 250 may be any proper connector or port, and may be configured to receive power from an external power supply and/or configured to provide power to an external load. For example, in some implementation solutions, the power connector 250 may be configured to recharge a battery in the power subsystem 240. In another implementation solution, the power connector 250 may be configured to transmit power stored in (or available to) the power subsystem 240 to the stylus 100.

The electronic device 200 further includes the wireless interface 260 to facilitate electronic communication between the electronic device 200 and the stylus 100. In an implementation solution, the electronic device 200 may be configured to communicate with the stylus 100 through a low energy Bluetooth communication interface or a near field communication interface. In another example, the communication interface facilitates electronic communication between the electronic device 200 and an external communication network, a device, or a platform.

The wireless interface 260 (whether a communication interface between the electronic device 200 and the stylus 100 or another communication interface) may be implemented as one or more wireless interfaces, a Bluetooth interface, a near field communication interface, a magnetic interface, a universal serial bus interface, an inductance interface, a resonant interface, a capacitive coupling interface, a Wi-Fi interface, a TCP/IP interface, a network communication interface, an optical interface, an acoustic interface, or any conventional communication interface.

The electronic device 200 further includes the display 270. The display 270 may be located behind the input surface 220, or may be integrated with the input surface 220. The display 270 may be communicatively coupled to the processor 210. The processor 210 may present information to a user through the display 270. In many cases, the processor 210 presents, through the display 270, an interface with which a user can interact. In many cases, the user manipulates the stylus 100 to interact with an interface.

It is appreciated by a person skilled in the art that some of the foregoing specific details presented by the electronic device 200 may not be required to practice the particular implementation solutions or equivalents thereof. Similarly, another electronic device may include more subsystems, modules, components, and the like. In a proper case, some submodules may be implemented as software or hardware. Therefore, it should be understood that the foregoing descriptions are not intended to be exhaustive or to limit the disclosure to the exact form in this specification. On the contrary, it is appreciated by a person of ordinary skill in the art that many modifications and variations are possible based on the foregoing teachings.

Figure 8:
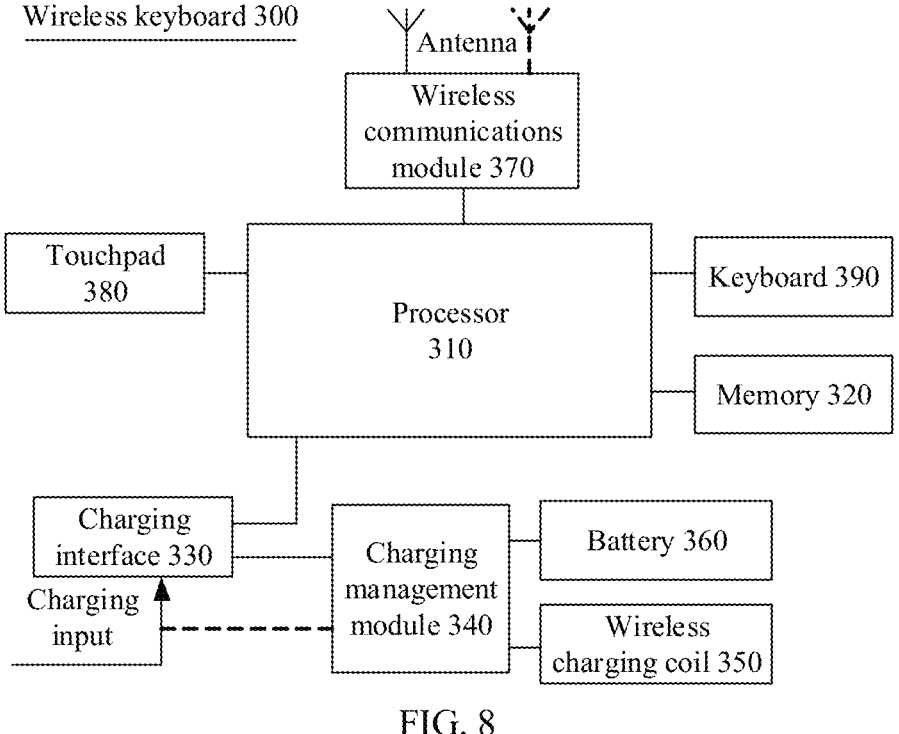
FIG. 8 is a schematic diagram of a hardware structure of a wireless keyboard according to an embodiment of this application.

FIG. 8 is a schematic diagram of a hardware structure of a wireless keyboard according to an embodiment of this application. Refer to FIG. 8. The wireless keyboard 300 may include a processor 310, a memory 320, a charging interface 330, a charging management module 340, a wireless charging coil 350, a battery 360, a wireless communications module 370, a touchpad 380, and a keyboard 390.

The processor 310, the memory 320, the charging interface 330, the charging management module 340, the battery 360, the wireless communications module 370, the touchpad 380, the keyboard 390, and the like may all be disposed on a keyboard body (that is, the keyboard body 302 shown in FIG. 1) of the wireless keyboard 300. The wireless charging coil 350 may be disposed in the connecting portion 304 (shown in FIG. 4) for movably connecting the keyboard body and a support. It may be understood that the structure shown in this embodiment does not constitute a specific limitation on the wireless keyboard 300. In some other embodiments, the wireless keyboard 300 may include more or fewer components than those shown in the figure, or combine some components, or split some components, or have different component arrangements. The components shown in the figure may be implemented in hardware, software, or a combination of software and hardware.

The memory 320 may be configured to store program code, for example, program code used to wirelessly charge the stylus 100. The memory 320 may further store a Bluetooth address for uniquely identifying the wireless keyboard 300. In addition, the memory 320 may further store connection data of an electronic device successfully paired with the wireless keyboard 300. For example, the connection data may be a Bluetooth address of the electronic device successfully paired with the wireless keyboard 300. Based on the connection data, the wireless keyboard 300 can be automatically paired with the electronic device without configuring a connection between the wireless keyboard 300 and the electronic device, for example, performing validity verification. The Bluetooth address may be a media access control (media access control, MAC) address.

The processor 310 may be configured to: execute the application code, and invoke related modules to implement functions of the wireless keyboard 300 in this embodiment of this application, for example, implement a wired charging function, a reverse wireless charging function, a wireless communication function, and the like of the wireless keyboard 300. The processor 310 may include one or more processing units, and different processing units may be independent devices, or may be integrated into one or more processors 310. The processor 310 may be specifically an integrated control chip, or may include a circuit including various active and/or passive components, and the circuit is configured to perform functions of the processor 310 described in this embodiment of this application. The processor of the wireless keyboard 300 may be a microprocessor.

The wireless communications module 370 may be configured to support data exchange between the wireless keyboard 300 and another electronic device including wireless communication such as Bluetooth (Bluetooth, BT), a global navigation satellite system (global navigation satellite system, GNSS), a wireless local area network (wireless local area network, WLAN) (for example, a wireless fidelity (wireless fidelity, Wi-Fi) network), frequency modulation (frequency modulation, FM), near field communication (near field communication, NFC), and an infrared (infrared, IR) technology.

In some embodiments, the wireless communications module 370 may be a Bluetooth chip. The wireless keyboard 300 may be a Bluetooth keyboard. The wireless keyboard 300 may be paired with a Bluetooth chip of another electronic device through the Bluetooth chip and establish a wireless connection, to implement wireless communication between the wireless keyboard 300 and the another electronic device through the wireless connection.

In addition, the wireless communications module 370 may further include an antenna. The wireless communications module 370 receives an electromagnetic wave through the antenna, performs frequency modulation and filtering processing on an electromagnetic wave signal, and sends a processed signal to the processor 310. The wireless communications module 370 may further receive a to-be-sent signal from the processor 310, perform frequency modulation and amplification on the signal, and convert the signal into an electromagnetic wave for radiation through the antenna.

In some embodiments, the wireless keyboard 300 may support wired charging. Specifically, the charging management module 340 may receive a charging input of a wired charger through the charging interface 330.

In some other embodiments, the wireless keyboard 300 may support forward wireless charging. The charging management module 340 may receive a wireless charging input through the wireless charging coil 350 of the wireless keyboard 300. Specifically, the charging management module 340 is connected to the wireless charging coil 350 through a matching circuit. The wireless charging coil 350 may be coupled to the wireless charging coil of the wireless charger to induce an alternating electromagnetic field emitted by the wireless charging coil 350 of the wireless charger and generate an alternating electrical signal. The alternating electrical signal generated by the wireless charging coil 350 is transmitted to the charging management module 340 through the matching circuit, to wirelessly charge the battery 360.

The charging management module 340 may further supply power to the wireless keyboard 300 while charging the battery 360. The charging management module 340 receives an input of the battery 360, and supplies power to the processor 310, the memory 320, an external memory, the wireless communications module 370, and the like. The charging management module 340 may be further configured to monitor parameters such as a battery capacity, a battery cycle count, and a battery health status (such as leakage or impedance) of the battery 360. In some other embodiments, the charging management module 340 may alternatively be disposed in the processor 310.

In some other embodiments, the wireless keyboard 300 may support reverse wireless charging. Specifically, the charging management module 340 may further receive an input of the charging interface 330 or the battery 360, and convert a direct electric signal that is input by the charging interface 330 or the battery 360 into an alternating electric signal. The alternating electric signal is transmitted to the wireless charging coil 350 through a matching circuit. The wireless charging coil 350 may generate an alternating electromagnetic field when receiving the alternating electric signal. A wireless charging coil of another mobile terminal induces the alternating electromagnetic field to perform wireless charging. To be specific, the wireless keyboard 300 may also wirelessly charge the another mobile terminal. In an embodiment, the wireless charging coil 350 may be disposed in the accommodating portion 303 of the wireless keyboard 300, and a wireless charging coil is disposed in the stylus rod 20 of the stylus 100. When the stylus 100 is placed in the accommodating portion 303, the wireless keyboard 300 may charge the stylus 100 through the wireless charging coil 350.

It should be noted that the matching circuit may be integrated into the charging management module 340, and the matching circuit may be independent of the charging management module 340. This is not limited in this embodiment of this application. FIG. 8 is a schematic diagram of a hardware structure of the wireless keyboard 300 by using an example in which the matching circuit may be integrated into the charging management module 340.

The charging interface 330 may be configured to provide a wired connection for charging or communication between the wireless keyboard 300 and another electronic device (for example, a wired charger of the wireless keyboard 300).

A touch sensor is integrated into the touchpad 380. A notebook computer may receive a user control command on the notebook computer through the touchpad 380 and the keyboard 390.

It may be understood that the structure shown in this embodiment of this application does not constitute a specific limitation on the wireless keyboard 300. The wireless keyboard 300 may have more or fewer components than those shown in FIG. 8, may combine two or more components, or may have different component configurations. For example, a housing of the wireless keyboard 300 may also be provided with an accommodating portion for accommodating the stylus 100. The wireless charging coil 350 is disposed in the accommodating portion, and is configured to wirelessly charge the stylus 100 when the stylus 100 is accommodated in the accommodating portion.

For another example, the outer surface of the wireless keyboard 300 may further include components such as a button, an indicator (which may indicate a state such as a battery level, an incoming/outgoing call, and a pairing mode), and a display screen (which may prompt a user with related information). The button may be a physical button, a touch key (used in collaboration with the touch sensor), or the like, and is used to trigger an operation such as power-on, power-off, starting charging, or stopping charging.

In the related technology, the stylus 100 is usually adsorbed at a fixed location of the electronic device (tablet) 200 (for example, a side surface of the tablet) through magnetic adsorption. To charge a battery in the stylus 100, a wireless charging coil is usually disposed in the stylus 100, and a wireless charging coil is disposed at the fixed location of the electronic device 200. Charging can be implemented only when the wireless charging coil of the stylus 100 is aligned with the wireless charging coil at the fixed location of the tablet. Consequently, when the stylus 100 is charged, the user often needs to align the two wireless charging coils for a plurality of times to implement charging, and therefore the user cannot quickly charge the stylus 100.

To resolve the foregoing problem, in this embodiment of this application, a first charging coil 3031 is disposed in the accommodating portion 303 of the wireless keyboard 300, and a second charging coil 90 is disposed in the stylus 100. When the stylus 100 is accommodated in the accommodating portion 303, a location of the first charging coil 3031 corresponds to a location of the second charging coil 90, at least one of the first charging coil 3031 and the second charging coil 90 is a circle coil, and the circle coil is disposed around circumference of the accommodating portion 303 or the stylus 100. In this way, when the stylus 100 is blindly inserted into the accommodating portion 303, the circle coil in the first charging coil 3031 and the second charging coil 90 is always coupled to the other charging coil, to implement a function of 360° blind insertion charging of the stylus 100, and avoid an operation of alignment between the wireless charging coil of the stylus 100 and the wireless charging coil of the electronic device 200 when the stylus 100 is charged.

In addition, the stylus 100 can be accommodated in the accommodating portion 303 of the wireless keyboard 300, so that the stylus 100 can be carried more portably. Therefore, according to the wireless keyboard 300 and the stylus 100 provided in this embodiment of this application, the stylus 100 can be charged when the stylus 100 is blindly inserted into the accommodating portion 303, to resolve a prior-art problem that the user cannot quickly charge the stylus 100 because the charging coils need to be aligned for a plurality of times when the stylus 100 is charged.

Figure 9:
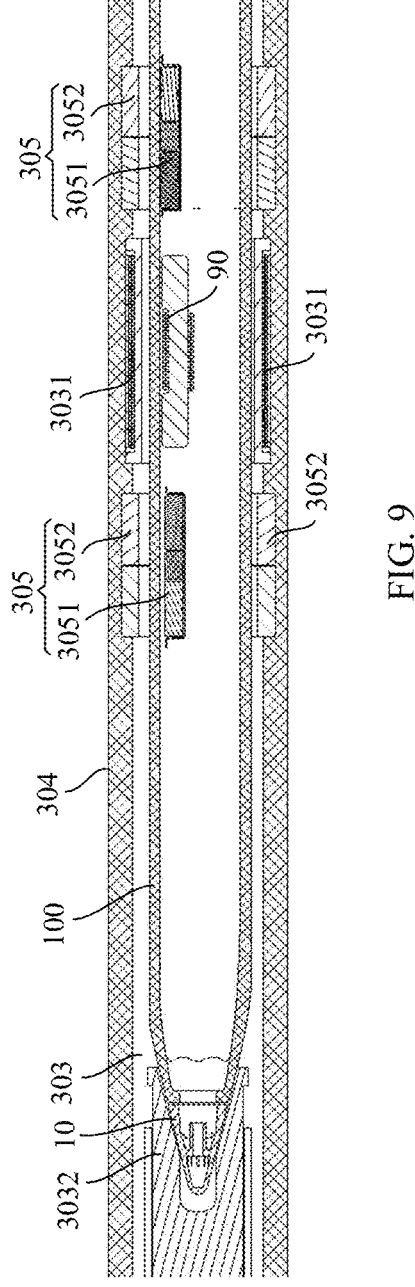
FIG. 9 is a schematic diagram of a partial cross-sectional structure of an electronic device component along an A-A direction in FIG. 5A according to an embodiment of this application.

FIG. 9 is a schematic diagram of a partial cross-sectional structure along an A-A direction in FIG. 5A. Refer to FIG. 9. The first charging coil 3031 is disposed in the accommodating portion 303, and the second charging coil 90 corresponding to the first charging coil 3031 is disposed in the stylus 100. It should be understood that the correspondence between the first charging coil 3031 and the second charging coil 90 specifically refers to a mutual location relationship obtained when the first charging coil 3031 and the second charging coil 90 can be coupled when the stylus 100 is accommodated in the accommodating portion 303.

At least one of the first charging coil 3031 and the second charging coil 90 is a circle coil, and the circle coil is disposed around circumference of the accommodating portion 303 or the stylus 100. For example, as shown in FIG. 9, the first charging coil 3031 of the accommodating portion 303 may be a 360° circle coil, and the first charging coil 3031 is disposed around circumference of an inner wall of the accommodating portion 303, that is, the first charging coil 3031 is disposed in one circle around the circumference of the inner wall of the accommodating portion 303; and the second charging coil 90 may be a non-circle coil. In this way, when the stylus 100 is blindly inserted into the accommodating portion 303, the annular first charging coil 3031 of the accommodating portion 303 is always coupled to the second charging coil 90 of the stylus 100, so that the stylus 100 can be charged when the stylus 100 is blindly inserted into the accommodating portion 303.

Certainly, in some examples, the second charging coil 90 of the stylus 100 may be set as a 360° circle coil, and the first charging coil 3031 of the accommodating portion 303 may be set as a non-circle coil. In this way, when the stylus 100 is blindly inserted into the accommodating portion 303, the circle coil of the stylus 100 is always coupled to the first charging coil of the accommodating portion 303 to charge the stylus 100.

Alternatively, in some examples, both the first charging coil 3031 and the second charging coil 90 may be set as 360° circle coils. In this way, when the stylus 100 is blindly inserted into the accommodating portion 303, the two annular charging coils are opposite to each other, and the two annular charging coils are coupled in each direction to implement fast charging.

It should be noted that when the at least one of the first charging coil 3031 and the second charging coil 90 is the circle coil, the circle coil may be a 360° continuous closed circle coil, or the circle coil may be a non-closed circle coil. It should be understood that when the circle coil is the non-closed circle coil, a spacing at a non-closed location needs to ensure that the circle coil can be coupled to the other charging coil when the stylus 100 is blindly inserted.

Figure 10:
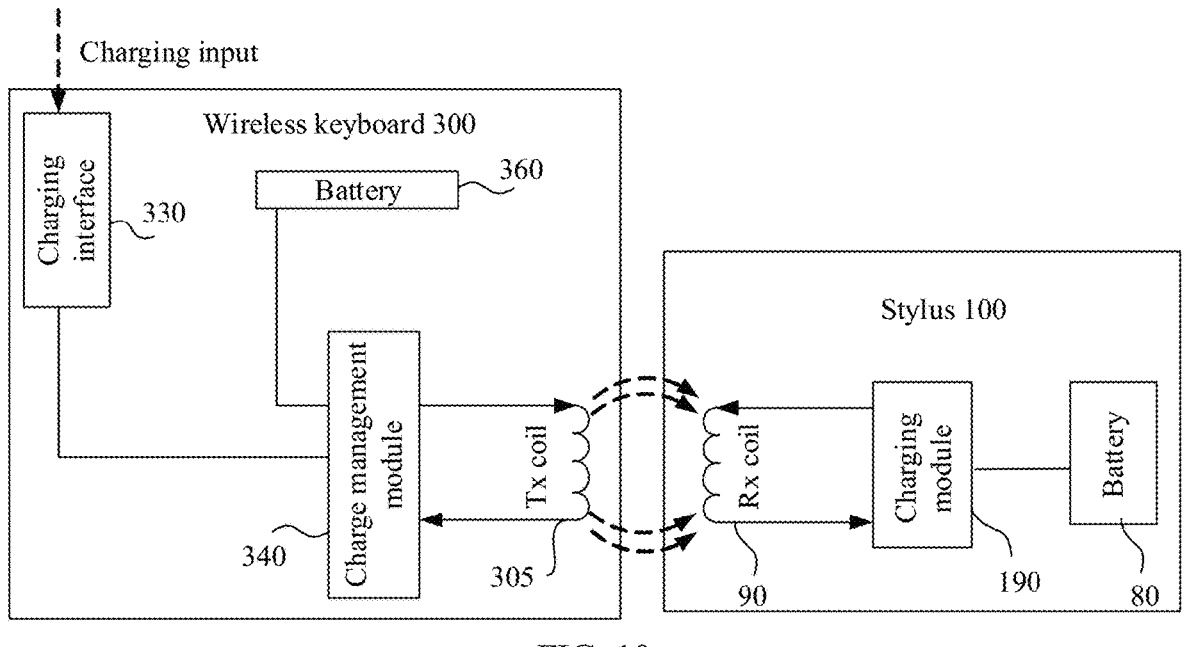
FIG. 10 is a schematic block diagram in which a wireless keyboard charges a stylus according to an embodiment of this application.

The stylus 100 is charged in the accommodating portion 303. In this case, as shown in FIG. 10, the first charging coil 3031 is a transmit (Tx) coil, the second charging coil 90 is a receive (Rx) coil, and the first charging coil 3031 is coupled to the second charging coil 90. The charging management module 340 in the wireless keyboard 300 receives a direct electric signal provided by the charging interface 330. The charging management module 340 may convert the direct electric signal into an alternating electric signal, and then input the alternating electric signal to the first charging coil 3031. The first charging coil 3031 can generate an alternating electromagnetic field in response to the alternating electric signal. The second charging coil 90 senses the alternating electromagnetic field, and transmits the alternating electric signal to the charging module 190. The charging module 190 can rectify the alternating electric signal into a direct electric signal, and provide the direct electric signal to the battery 80, to charge the battery 80.

It should be noted that when the wireless charging coil 350 in FIG. 8 is a transmit coil, the wireless charging coil 350 in FIG. 8 may serve as the first charging coil 3031.

To ensure that the stylus 100 does not fall out easily when being accommodated in the accommodating portion 303, or to ensure that a location of the stylus 100 is fixed when the stylus 100 is accommodated in the accommodating portion 303 for charging, in this embodiment of this application, as shown in FIG. 9, the electronic device component further includes: at least one group of limiting components 305, where the limiting component 305 is configured to limit a location of the stylus 100 in the accommodating portion 303, so that according to the limiting component 305, the location at which the stylus 100 is accommodated in the accommodating portion 303 is limited, to prevent the stylus 100 from falling out of the accommodating portion 303, and ensure that the first charging coil 3031 and the second charging coil 90 are always coupled in a charging process of the stylus 100.

In this embodiment of this application, one implementation of the limiting component 305 is as follows: As shown in FIG. 9, the limiting component 305 includes a first ring magnet 3052 and a magnetic piece 3051 attracted to the first ring magnet 3052, one of the first ring magnet 3052 and the magnetic piece 3051 is located on the inner wall of the accommodating portion 303, and the other of the first ring magnet 3052 and the magnetic piece 3051 is located in the stylus 100.

For example, as shown in FIG. 9, the first ring magnet 3052 is located on the inner wall of the accommodating portion 303, and the first ring magnet 3052 is disposed in a circle along circumference of the inner wall of the accommodating portion 303. The magnetic piece 3051 is located in the stylus 100, the stylus 100 is accommodated in the accommodating portion 303, and the stylus 100 is fastened to the accommodating portion 303 through attraction between the first ring magnet 3052 and the magnetic piece 3051.

The limiting component 305 includes the first ring magnet 3052 and the magnetic piece 3051. In this way, the stylus 100 can be fastened when the stylus 100 is blindly inserted into the accommodating portion 303. In the conventional technology, a magnet in the stylus 100 often needs to be aligned with a magnet on the electronic device 200 or the wireless keyboard 300 to implement adsorption and fastening. Therefore, in this embodiment of this application, the stylus 100 can be fastened when the stylus 100 is blindly inserted into the accommodating portion 303 at any degree within 360 degrees.

Certainly, in some examples, the first ring magnet 3052 may alternatively be disposed in the stylus 100, and the magnetic piece 3051 may be disposed on the inner wall of the accommodating portion 303. It should be noted that the magnetic piece 3051 may be an annular magnetic piece 3051, or may be a magnetic sheet, a magnetic strip, or the like.

In this embodiment of this application, as shown in FIG. 9, there are two groups of limiting components 305, and the two groups of limiting components 305 are respectively located on two sides of the first charging coil 3031 and the second charging coil 90. For example, as shown in FIG. 9, two first ring magnets 3052 in the two groups of limiting components 305 are respectively located on two sides of the first charging coil 3031. Two magnetic pieces 3051 in the two groups of limiting components 305 are respectively located on two sides of the second charging coil 90. Certainly, in some examples, two first ring magnets 3052 may alternatively be located on two sides of the second charging coil 90, and two magnetic pieces 3051 may be respectively located on two sides of the first charging coil 3031.

Alternatively, in some examples, in one group of limiting components 305, a first ring magnet 3052 is located on the inner wall of the accommodating portion 303, and a magnetic piece 3051 is located in the stylus 100; and in the other group of limiting components 305, a first ring magnet 3052 is located in the stylus 100, and a magnetic piece 3051 is located on the inner wall of the accommodating portion 303. In this case, the first ring magnet 3052 in the one group of limiting components 305 and the magnetic piece 3051 in the other group of limiting components 305 are respectively located on two sides of the first charging coil 3031, and the magnetic piece 3051 in the one group of limiting components 305 and the first ring magnet 3052 in the other group of limiting components 305 are respectively located on two sides of the second charging coil 90.

Figure 11:
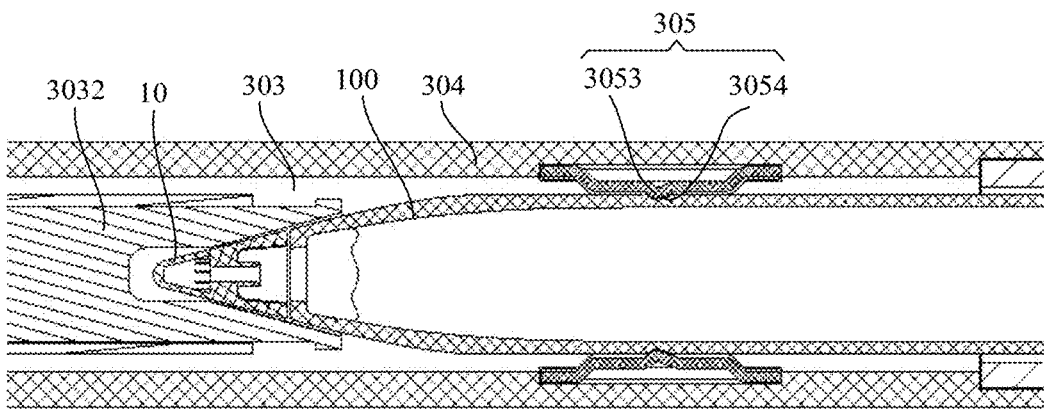
FIG. 11 is a schematic diagram of a partial cross-sectional structure of an electronic device component along an A-A direction in FIG. 5A according to an embodiment of this application.

Another implementation of the limiting component 305 is as follows: Refer to FIG. 11. The limiting component 305 includes: an elastic buckle 3053 and a buckle groove 3054 (for details, refer to FIG. 13B) connected to the elastic buckle 3053, where one of the elastic buckle 3053 and the buckle groove 3054 is disposed on the inner wall of the accommodating portion 303, and the other of the elastic buckle 3053 and the buckle groove 3054 is disposed on the stylus 100. For example, as shown in FIG. 11, the elastic buckle 3053 is disposed on the inner wall of the accommodating portion 303, and the buckle groove 3054 is located on the stylus 100 (for details, refer to FIG. 13B). Certainly, the elastic buckle 3053 may alternatively be located on the stylus 100, and the buckle groove 3054 may be disposed on the inner wall of the accommodating portion 303.

It should be noted that, to implement that the stylus 100 can be fastened when the stylus 100 is blindly inserted into the accommodating portion 303 at any degree within 360°, in this embodiment of this application, one of the elastic buckle 3053 and the buckle groove 3054 may be an annular structure. For example, the buckle groove 3054 may be an annular buckle groove 3054, and the annular buckle groove 3054 may be disposed in one circle along the circumference of the inner wall of the accommodating portion 303 or the circumference of the outer surface of the stylus 100, or the elastic buckle 3053 may be an annular buckle, and the annular buckle may be disposed in one circle along the circumference of the inner wall of the accommodating portion 303 or the circumference of the outer surface of the stylus 100. In this way, the stylus 100 is fastened in the accommodating portion 303 when the stylus 100 is blindly inserted into the accommodating portion 303, to facilitate accommodating of the stylus 100 by the user.

Figure 13A:
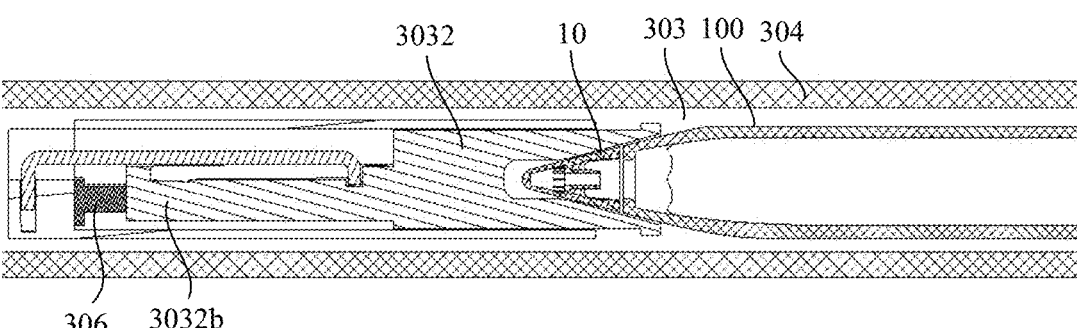
FIG. 13A is a schematic diagram of a partial cross-sectional structure of an electronic device component along an A-A direction in FIG. 5A according to an embodiment of this application.

In a possible implementation, to facilitate removal of the stylus 100 from the accommodating portion 303, as shown in FIG. 11 and FIG. 13A, the electronic device component further includes: an elastic pressing component 3032, where the elastic pressing component 3032 is located in the accommodating portion 303, and when the stylus 100 is accommodated in the accommodating portion 303, one end of the elastic pressing component 3032 is in contact with the stylus tip of the stylus 100, the elastic pressing component 3032 is in a compressed state under an action of the stylus 100, and the elastic pressing component 3032 is locked; and when the user needs to take out the stylus 100, the user may press a rear cover of the stylus 100, the stylus 100 applies a thrust force to the elastic pressing component 3032 again, the elastic pressing component 3032 is unlocked under the thrust force, and the elastic pressing component 3032 in the compressed state ejects the stylus 100 outward based on an elastic force. For a specific structure of the elastic pressing component 3032, refer to detailed descriptions of FIG. 13B.

The elastic pressing component 3032 is disposed, so that the stylus 100 can be easily taken out and placed in the accommodating portion 303. In addition, when the stylus 100 is inserted into the accommodating portion 303, the user can determine, through fitting between the stylus 100 and the elastic pressing component 3032, that the stylus 100 is properly inserted into the accommodating portion 303.

Figure 12:
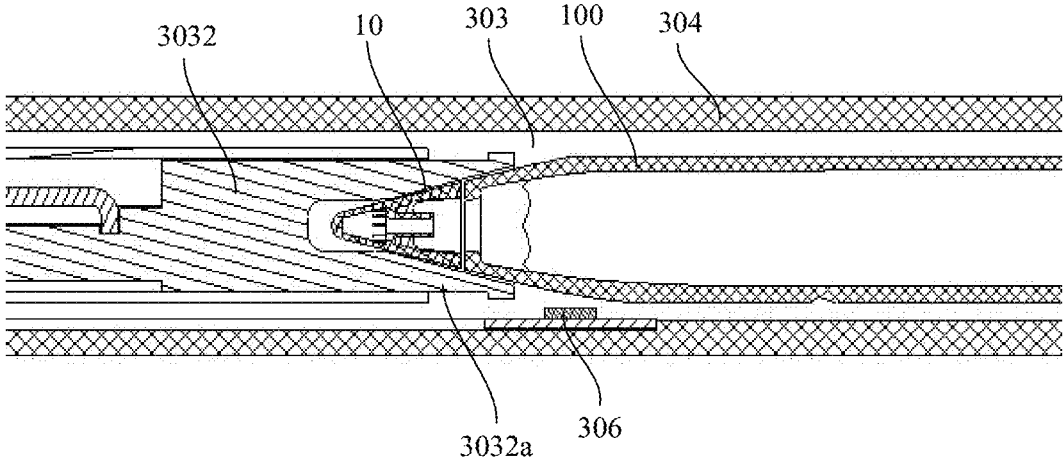
FIG. 12 is a schematic diagram of a partial cross-sectional structure of an electronic device component along an A-A direction in FIG. 5A according to an embodiment of this application.

When the stylus 100 starts to be charged in the accommodating portion 303, it is necessary to detect that the stylus 100 is properly inserted into the accommodating portion 303. To detect whether the stylus 100 is properly inserted into the accommodating portion 303, in this embodiment of this application, as shown in FIG. 12, the electronic device component further includes: a sensing component 306, where the sensing component 306 is configured to be triggered when the stylus 100 is properly inserted into the accommodating portion 303, so that the wireless keyboard can control, based on a signal generated when the sensing component is triggered, whether to start charging the stylus 100.

It should be understood that the sensing component 306 needs to transmit a signal to a control board in the wireless keyboard 300. Therefore, the sensing component 306 is electrically connected to the control board in the wireless keyboard 300 in a wired or wireless manner.

The sensing component 306 is disposed, to implement sensing detection on whether the stylus 100 is properly inserted into the accommodating portion 303. Therefore, it can be ensured that the wireless keyboard 300 starts charging the stylus 100 only when the stylus 100 is properly accommodated, to avoid power consumption caused because the wireless keyboard 300 starts charging and the stylus 100 is not properly installed.

In embodiments of this application, there may be a plurality of implementations of the sensing component 306. One of the implementations is as follows: Refer to FIG. 12. The sensing component 306 may be an infrared sensor, and the infrared sensor is disposed in the accommodating portion 303. When the stylus 100 is accommodated in the accommodating portion 303, the infrared sensor is close to one end that is of the elastic pressing component 3032 and that faces the stylus tip of the stylus 100 (that is, a first end 3032a of the elastic pressing component 3032 in FIG. 12). In this way, when the stylus 100 is properly accommodated in the accommodating portion 303, one end of the stylus tip of the stylus 100 blocks light of the infrared sensor, the infrared sensor senses a change of the light, and the wireless keyboard 300 determines, based on the change that is of the light and that is sensed by the infrared sensor, that the stylus 100 is properly inserted into the accommodating portion 303. In this case, the wireless keyboard 300 can start charging the stylus 100.

Another implementation of the sensing component 306 is as follows: Refer to FIG. 13A. The sensing component 306 is a pressure sensor, the pressure sensor is located in the accommodating portion 303, and the pressure sensor is in contact with one end of the elastic pressing component 3032 (for example, one end that is of the elastic pressing component 3032 and that faces away from the stylus tip of the stylus 100, that is, a second end 3032b in FIG. 13A). The pressure sensor is configured to detect a magnitude of pressure applied when the elastic pressing component 3032 is compressed. When the stylus 100 is properly accommodated in the accommodating portion 303, the stylus tip of the stylus 100 applies pressure to the elastic pressing component 3032, and the pressure is transmitted to the pressure sensor. The control board in the wireless keyboard 300 can determine, based on the magnitude of the pressure sensed by the sensor, whether the stylus 100 is properly accommodated.

Figure 13B:
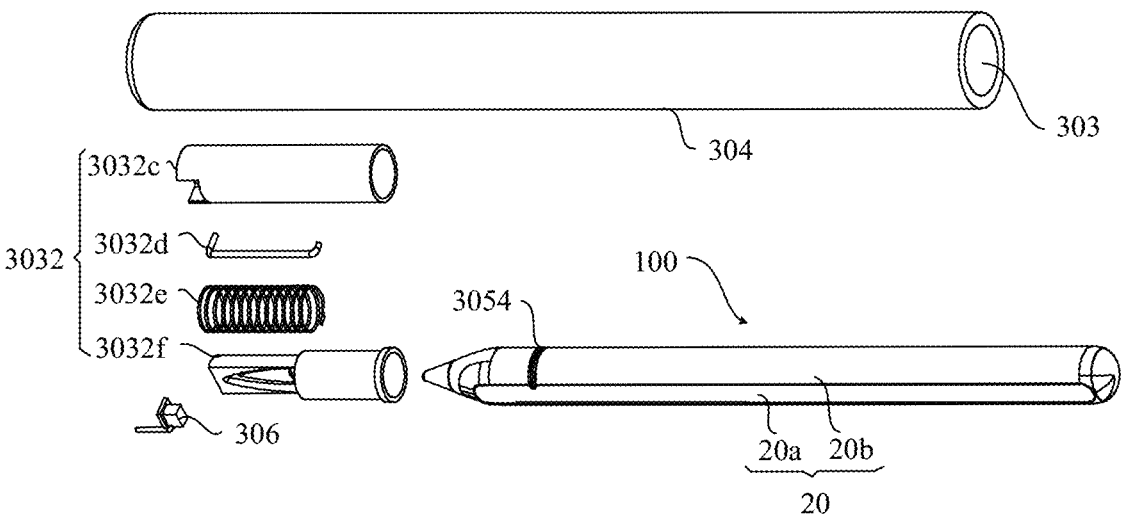
FIG. 13B is a schematic exploded view of FIG. 13A.

In this embodiment of this application, as shown in FIG. 13B, the elastic pressing component 3032 may include: a fixed sleeve 3032c, an elastic piece 3032e, a sliding rod 3032d, and a sliding sleeve 3032f, where the fixed sleeve 3032c is fastened at a tail end of the accommodating portion 303, the fixed sleeve 3032c has two cavities connected to each other, and inner diameters of the two cavities are different. The elastic piece 3032e is sleeved on one end of the sliding sleeve 3032f (for example, a left end of the sliding sleeve 3032f in FIG. 13B, that is, a second end 3032b in FIG. 13A), one end of the elastic piece 3032e abuts on a junction of the two cavities of the fixed sleeve 3032c, one end of the sliding rod 3032d is slidably disposed on the sliding sleeve 3032f, and the other end of the sliding rod 3032d passes through a location of a connection between the two cavities of the fixed sleeve 3032c and protrudes into a cavity that is of the fixed sleeve 3032c and that is away from the stylus 100. An inner wall of the cavity that is of the fixed sleeve 3032c and that is away from the stylus 100 has a buckle (not shown) snapped into one end of the sliding rod 3032d. Both the sensing component 306 (that is, the pressure sensor) and the elastic piece 3032e are located in a cavity at one end that is of the fixed sleeve 3032c and that faces the stylus 100.

In this manner, when the stylus 100 is accommodated in the accommodating portion 303, the stylus tip of the stylus 100 applies an external force to one end of the sliding sleeve 3032f, the sliding sleeve 3032f slides in the fixed sleeve 3032c, the elastic piece 3032e is compressed, and the sliding rod 3032d is snapped into the buckle in the fixed sleeve 3032c under the push of the sliding sleeve 3032f, so that the elastic pressing component 3032 is locked. When the user presses the tail of the stylus 100 again, the stylus 100 applies an external force to the sliding sleeve 3032f again, the external force pushes the sliding rod 3032d out of the buckle, and the elastic pressing component 3032 is unlocked. In this case, an elastic force of the elastic piece 3032e drives the sliding sleeve 3032f to move toward the stylus 100, and the movement of the sliding sleeve 3032f drives the stylus 100 to eject from the accommodating portion 303.

In this embodiment of this application, as shown in FIG. 13B, the outer surface of the stylus rod 20 of the stylus 100 includes a flat surface 20a and a curved surface 20b, that is, the outer surface of the stylus rod 20 is not a circular surface. In this embodiment of this application, the outer surface of the stylus rod 20 includes the flat surface 20a, to help the user hold the stylus rod 20 of the stylus 100. In addition, when the stylus 100 is placed on the inclined surface, the flat surface 20a may play a role in preventing the stylus 100 from falling downward, for example, the flat surface 20a of the stylus 100 may be placed on the inclined surface, to prevent the stylus 100 from falling downward when the stylus 100 is placed on the inclined surface.

Figure 14:
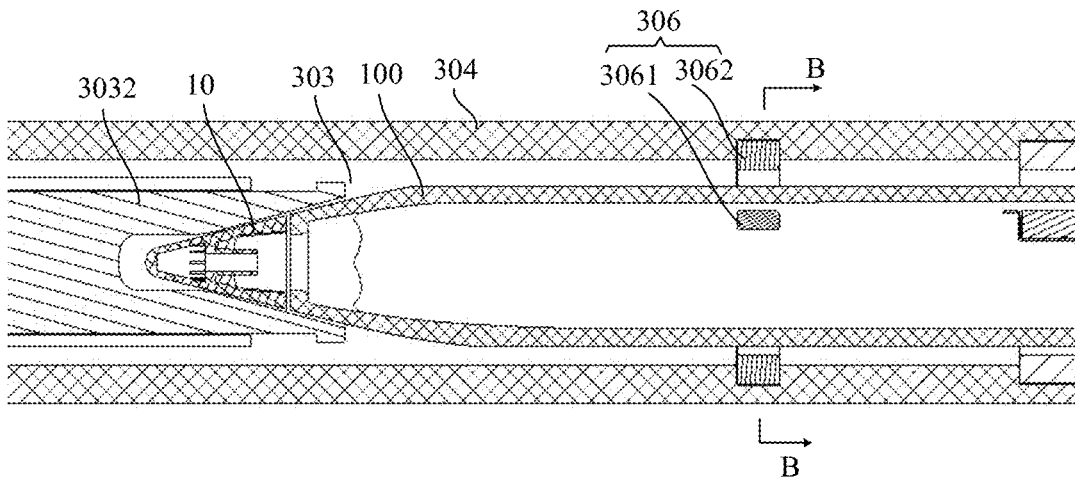
FIG. 14 is a schematic diagram of a partial cross-sectional structure of an electronic device component along an A-A direction in FIG. 5A according to an embodiment of this application.

A third implementation of the sensing component 306 is as follows: Refer to FIG. 14. The sensing component 306 includes: a second ring magnet 3062 and a Hall sensor 3061 corresponding to the second ring magnet 3062, where one of the second ring magnet 3062 and the Hall sensor 3061 is disposed on an inner wall of the accommodating portion 303, and the other of the second ring magnet 3062 and the Hall sensor 3061 is disposed in the stylus 100.

It should be understood that the correspondence between the second ring magnet 3062 and the Hall sensor 3061 specifically indicates that when the stylus 100 is properly accommodated in the accommodating portion 303, the second ring magnet 3062 and the Hall sensor 3061 may be correspondingly disposed face to face (for details, refer to FIG. 14).

For example, as shown in FIG. 14, the second ring magnet 3062 is located on the inner wall of the accommodating portion 303, and the Hall sensor 3061 is located in the stylus 100. In this way, when the stylus 100 is properly inserted into the accommodating portion 303, the Hall sensor 3061 can sense a magnetic line generated by the second ring magnet 3062, the Hall sensor 3061 can be electrically connected to a circuit board in the stylus 100, and the circuit board in the stylus 100 can send, based on a signal sensed by the Hall sensor 3061, a signal for starting charging to a control board in the wireless keyboard 300. In this way, the control board in the wireless keyboard 300 releases a charging signal, and the charging management module 340 (for details, refer to FIG. 10) provides a direct electric signal to the second charging coil 90 based on the received charging signal, and starts charging the stylus 100.

Certainly, to reduce signal interaction, in some examples, the Hall sensor 3061 may be disposed on the inner wall of the accommodating portion 303, and the Hall sensor 3061 is electrically connected to the control board in the wireless keyboard 300. In this way, a change of the signal sensed by the Hall sensor 3061 may be directly transmitted to the control board in the wireless keyboard 300, the control board releases the charging signal based on the signal transmitted by the Hall sensor 3061, and the charging management module 340 (for details, refer to FIG. 10) provides the direct electric signal to the second charging coil 90 based on the charging signal, and starts charging the stylus 100.

Figure 15:
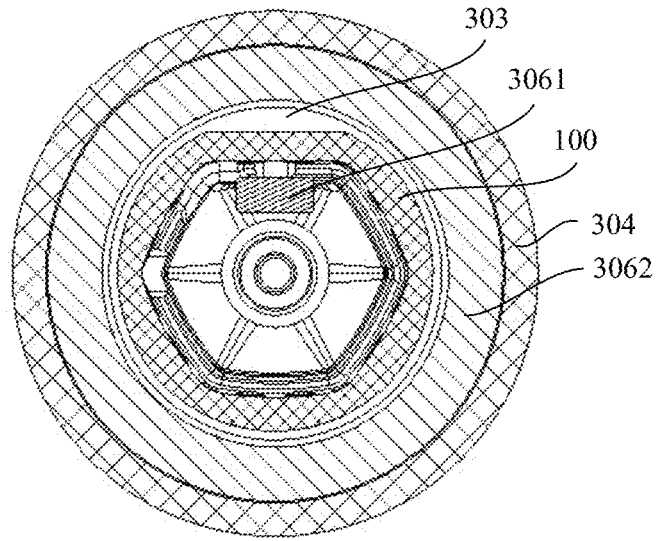
FIG. 15 is a schematic diagram of a cross-sectional structure of an electronic device component along a B-B direction in FIG. 14 according to an embodiment of this application.
Figure 16:
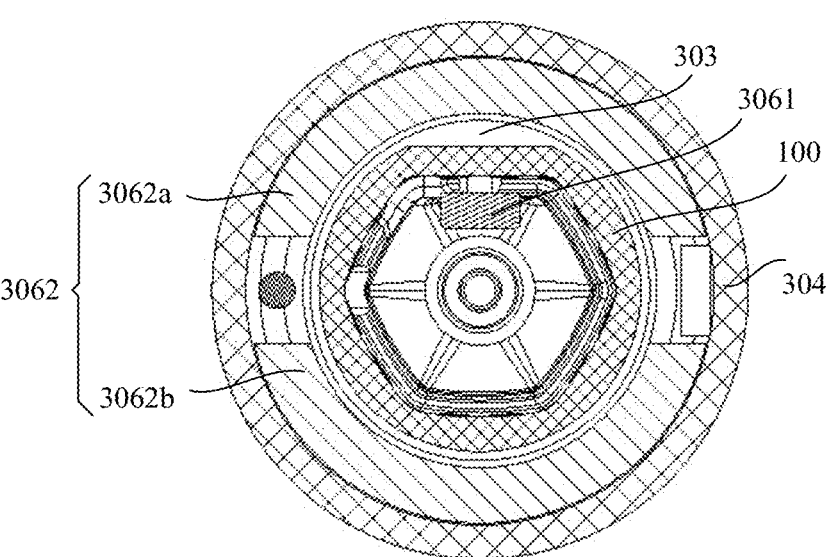
FIG. 16 is a schematic diagram of a cross-sectional structure of an electronic device component along a B-B direction in FIG. 14 according to an embodiment of this application.

It should be noted that, in this embodiment of this application, one structure of the second ring magnet 3062 is shown in FIG. 15, and the second ring magnet 3062 is a 360° ring magnet. Another structure of the second ring magnet 3062 is shown in FIG. 16. The second ring magnet 3062 is a non-closed ring magnet formed by two semicircular ring magnets disposed alternately. The two semicircular ring magnets are respectively a semicircular ring magnet 3062a and a semicircular ring magnet 3062b, the two semicircular ring magnets are disposed opposite to each other, and there is a spacing between two ends of the two semicircular rings. The spacing may be used as accommodating space of a circuit board or a harness, or a path through which a circuit board or a harness passes.

It should be noted that when the stylus 100 is accommodated in the accommodating portion 303, if the Hall sensor 3061 in FIG. 16 is opposite to the spacing between the two semicircular ring magnets, to avoid a problem that the Hall sensor 3061 cannot sense a magnetic line due to an excessively large spacing between the two semicircular ring magnets, in this embodiment of this application, the spacing between the two semicircular ring magnets needs to ensure that the Hall sensor 3061 can sense the magnetic line when the Hall sensor 3061 is opposite to the spacing.

It should be noted that, in this embodiment of this application, the sensing component 306 includes but is not limited to the foregoing three implementations, for example, an accommodating location of the stylus 100 may be detected by a sensor such as a laser.

In a possible implementation, to enable the user to intuitively observe a status of charging the stylus by the wireless keyboard, in this embodiment of this application, the electronic device component further includes: a charging indication module (not shown), where the charging indication module is configured to perform an indication when the wireless keyboard 300 charges the stylus 100. For example, when the stylus 100 is properly inserted into the accommodating portion 303, the wireless keyboard 300 controls, based on a signal transmitted by the sensing component 306, the charging indication module to indicate a charging status of the stylus 100. In this way, the user intuitively observes, through the charging indication module, whether the stylus 100 starts charging. Correspondingly, when charging of the stylus 100 is completed, the charging indication module may also indicate a charging complete state.

In this embodiment of this application, an implementation of the charging indication module is as follows: The charging indication module is disposed on the wireless keyboard 300. The charging indication module includes an indicator, and the indicator indicates a charging status of the stylus 100. For example, when the wireless keyboard 300 receives the signal transmitted by the sensing component 306, the wireless keyboard 300 controls the indicator to light up in a first color, for example, the indicator is a red light. When charging of the stylus 100 is completed, the indicator may light up in a first color, for example, the indicator is a yellow light.

An implementation of the charging indication module is as follows: The charging indication module is located in the electronic device 200, and the charging indication module includes a charging display unit. The charging display unit is configured to display a charging status of the stylus 100 through the touchscreen 201 when the wireless keyboard 300 charges the stylus 100, where the charging status includes a charging state, a charging complete state, a charging disconnected state, and a battery level state.

In the descriptions of embodiments of this application, it should be noted that the terms "mounting" and "connection" need to be broadly understood, for example, may be a fixed connection, or may be indirectly connected through an intermediate medium, or may be communication between two elements or an interaction between two elements, unless otherwise specified and defined. A person of ordinary skill in the art may understand specific meaning of the foregoing terms in embodiments of this application in specific circumstances.

The apparatus or element indicated in embodiments of this application or implications should have a specific orientation, and is constructed and operated in a specific orientation. Therefore, this cannot be understood as a limitation to embodiments of this application. In the descriptions of embodiments of this application, "a plurality of" means two or more, unless otherwise exactly specified.

The terms "first", "second", "third", "fourth", and the like (if existent) in the specification, claims, and accompanying drawings of embodiments of this application are used to distinguish between similar objects, but are not necessarily used to describe a particular order or sequence. It should be understood that the data used in such a manner are interchangeable in proper cases, so that embodiments of this application described herein can be implemented, for example, in an order other than those illustrated or described herein. In addition, the terms "may include", "have", and any variations thereof are intended to cover non-exclusive inclusion, for example, a process, method, system, product, or device including a series of steps or units is not necessarily limited to those steps or units clearly listed, but may include other steps or units that are not clearly listed or inherent to the process, method, product, or device.

Finally, it should be noted that The foregoing embodiments are merely intended to describe the technical solutions of embodiments of this application, but are not intended to limit this application. Although embodiments of this application are described in detail with reference to the foregoing embodiments, a person of ordinary skill in the art should understand that the person can still make modifications to the technical solutions recorded in the foregoing embodiments, or make equivalent replacements for some or all of the technical features, without departing from the scope of the technical solutions of embodiments of this application.

What is claimed is:

1. A wireless keyboard, comprising:
a keyboard body;
a support, wherein the keyboard body and the support are rotatably connected through a connecting portion;
an accommodating portion comprising an enclosed cavity for accommodating a stylus, wherein a) the accommodating portion is located on the connecting portion, or b) the accommodating portion is located in the connecting portion, or c) the accommodating portion is disposed proximate to the connecting portion;
a first charging coil disposed on an inner wall of the accommodating portion, wherein d) the first charging coil is a circle coil disposed around a circumference of the enclosed cavity of the accommodating portion, wherein the circle coil is a 360° continuous circle coil, or e) the circle coil is a non-closed circle coil; and
a limiting component arranged parallel to the inner wall of the accommodating portion, the limiting component configured to limit a location of the stylus in the accommodating portion.

2. The wireless keyboard of claim 1, wherein the enclosed cavity is a cylindrical cavity, and wherein one end of the cavity has an opening through which the stylus is configured to be inserted into the cavity.

3. The wireless keyboard of claim 1, further comprising a first ring magnet and a second ring magnet that are located on the inner wall of the accommodating portion and on two sides of the first charging coil, respectively.

4. The wireless keyboard of claim 3, wherein the first ring magnet and the second ring magnet are configured to attract correspondingly to a magnetic piece located in the stylus to limit a location of the stylus in the accommodating portion.

5. The wireless keyboard of claim 4, further comprising an elastic buckle disposed on the inner wall of the accommodating portion.

6. The wireless keyboard of claim 1, further comprising an elastic pressing component located in the accommodating portion, and configured to:
be compressed when the stylus is accommodated in the accommodating portion; and
drive the stylus to eject outward after one end of the stylus is pressed,
wherein one end of the elastic pressing component is in contact with a stylus tip of the stylus when the stylus is accommodated in the accommodating portion.

7. The wireless keyboard of claim 6, further comprising a sensing component configured to be triggered when the stylus is properly inserted into the accommodating portion, wherein the sensing component being triggered causes the stylus to start to be charged.

8. The wireless keyboard of claim 7, wherein the sensing component is a pressure sensor, the pressure sensor is located in the accommodating portion, the pressure sensor is in contact with one end of the elastic pressing component, and the pressure sensor is configured to detect a magnitude of pressure applied when the elastic pressing component is compressed.

9. The wireless keyboard of claim 7, wherein the sensing component is an infrared sensor, the infrared sensor is disposed in the accommodating portion, and the infrared sensor is proximate to one end of the elastic pressing component.

10. The wireless keyboard of claim 7, wherein the sensing component is a laser sensor.

11. The wireless keyboard of claim 7, wherein the sensing component comprises a third ring magnet, wherein the third ring magnet is disposed on the inner wall of the accommodating portion and is configured to correspond to a Hall sensor disposed in the stylus.

12. The wireless keyboard of claim 11, wherein either f) the third ring magnet is a 360° ring magnet, or g) the third ring magnet is a non-closed ring magnet formed by two semicircular ring magnets disposed alternately.

13. The wireless keyboard of claim 12, wherein the two semicircular ring magnets are disposed opposite to each other, and there is a spacing between two ends of the two semicircular rings.

14. The wireless keyboard of claim 13, wherein either h) the spacing is an accommodating space for a circuit board or a harness, or i) the spacing is a path through which a circuit board or a harness passes.

15. The wireless keyboard of claim 1, wherein the connecting portion is a rotating shaft, and wherein either j) the rotating shaft is connected to the keyboard body and the support is rotatably connected to the rotating shaft, or k) the rotating shaft is connected to the support and the keyboard body is rotatably connected to the rotating shaft.

16. The wireless keyboard of claim 1, further comprising a charging indication module configured to provide an indication when the wireless keyboard charges the stylus.

17. An electronic device component, comprising:
a wireless keyboard, comprising:
a keyboard body;
a support, wherein the keyboard body and the support are rotatably connected through a connecting portion;
an accommodating portion comprising an enclosed cavity for accommodating a stylus, wherein a) the accommodating portion is located on the connecting portion, or b) the accommodating portion is located in the connecting portion, or c) the accommodating portion is disposed proximate to the connecting portion;
a first charging coil disposed on an inner wall of the accommodating portion, wherein d) the first charging coil is a circle coil wrapping around a circumference of the enclosed cavity of the accommodating portion, wherein either the circle coil is a 360° continuous circle coil, or e) the circle coil is a non-closed circle coil;
a limiting component arranged parallel to the inner wall of the accommodating portion, the limiting component configured to limit a location of the stylus in the accommodating portion; and
an electronic device, comprising:
a touchscreen configured to be coupled to the wireless keyboard.

18. An electronic device component of claim 17, further comprising a stylus, wherein the stylus comprises a second charging coil corresponding to the first charging coil.

19. The electronic device component of claim 18, wherein the correspondence between the first charging coil and the second charging coil is a mutual location relationship obtained when the first charging coil and the second charging coil are coupled when the stylus is accommodated in the accommodating portion.

20. The electronic device component of claim 18, wherein an outer surface of the stylus includes a flat surface and a curved surface.

* * * * *